(12) United States Patent
Park et al.

(10) Patent No.: US 9,826,483 B2
(45) Date of Patent: Nov. 21, 2017

(54) APPARATUS, SYSTEM AND METHOD OF COMMUNICATING A WAKEUP PACKET

(71) Applicant: INTEL CORPORATION, Santa Clara, CA (US)

(72) Inventors: Minyoung Park, Portland, OR (US); Alexander W. Min, Portland, OR (US); Shahrnaz Azizi, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 46 days.

(21) Appl. No.: 14/864,923

(22) Filed: Sep. 25, 2015

(65) Prior Publication Data

US 2016/0374019 A1   Dec. 22, 2016

Related U.S. Application Data

(60) Provisional application No. 62/182,696, filed on Jun. 22, 2015.

(51) Int. Cl.
| | |
|---|---|
| *G08C 17/00* | (2006.01) |
| *H04W 52/02* | (2009.01) |
| *H04W 76/04* | (2009.01) |
| *H04L 5/00* | (2006.01) |
| *H04W 8/24* | (2009.01) |

(52) U.S. Cl.
CPC ....... *H04W 52/0229* (2013.01); *H04L 5/0007* (2013.01); *H04W 8/24* (2013.01); *H04W 76/046* (2013.01); *Y02B 60/50* (2013.01)

(58) Field of Classification Search
CPC .......... H04W 52/0229; H04W 76/046; H04W 72/042; H04W 8/24; H04W 52/02; H04L 5/0007; G08C 17/00
See application file for complete search history.

(56) References Cited

U.S. PATENT DOCUMENTS

| | | | |
|---|---|---|---|
| 8,175,109 B2 | 5/2012 | Nogueira-Nine et al. | |
| 8,553,576 B2 | 10/2013 | Park | |
| 9,277,448 B2 | 3/2016 | Park | |
| 9,313,741 B2 | 4/2016 | Park et al. | |
| 9,426,832 B2 | 8/2016 | Park et al. | |
| 9,485,733 B1 | 11/2016 | Park et al. | |
| 9,578,681 B2 | 2/2017 | Kenney et al. | |
| 2005/0059347 A1 | 3/2005 | Haartsen | |
| 2006/0252443 A1 | 11/2006 | Sammour et al. | |
| 2007/0226351 A1* | 9/2007 | Fischer | H04W 76/023 709/227 |

(Continued)

OTHER PUBLICATIONS

Notice of Allowance for U.S. Appl. No. 14/279,820, mailed on Oct. 24, 2016, 11 pages.

(Continued)

*Primary Examiner* — Ian N Moore
*Assistant Examiner* — Phong La
(74) *Attorney, Agent, or Firm* — Shichrur & Co.

(57) ABSTRACT

Some demonstrative embodiments include apparatuses, devices, systems and methods of communicating a wakeup packet. For example, an apparatus may include circuitry configured to cause a wireless device to generate a frame comprising a Low-Power Wakeup-Receiver (LP-WUR) capability indication to indicate a capability of the wireless device to process communication of a wakeup packet; and to transmit the frame.

25 Claims, 7 Drawing Sheets

(56) References Cited

U.S. PATENT DOCUMENTS

| | | | |
|---|---|---|---|
| 2010/0157955 A1* | 6/2010 | Liu | H04W 72/0446 370/336 |
| 2010/0240319 A1 | 9/2010 | Matsuo | |
| 2010/0314452 A1 | 12/2010 | Yeo et al. | |
| 2011/0038290 A1* | 2/2011 | Gong | H04W 52/0235 370/311 |
| 2011/0103280 A1 | 5/2011 | Liu et al. | |
| 2011/0243267 A1 | 10/2011 | Won et al. | |
| 2011/0255454 A1 | 10/2011 | Hauser et al. | |
| 2012/0147800 A1 | 6/2012 | Park et al. | |
| 2012/0171954 A1 | 7/2012 | Rudland et al. | |
| 2012/0250596 A1 | 10/2012 | Park et al. | |
| 2013/0083722 A1 | 4/2013 | Bhargava et al. | |
| 2013/0242847 A1* | 9/2013 | Oh | H04W 4/22 370/312 |
| 2013/0252657 A1 | 9/2013 | Kafle | |
| 2013/0301496 A1* | 11/2013 | Nagaraj | H04W 52/0216 370/311 |
| 2014/0050133 A1 | 2/2014 | Jafarian et al. | |
| 2014/0086124 A1 | 3/2014 | Knowles | |
| 2014/0098724 A1 | 4/2014 | Park et al. | |
| 2014/0105186 A1 | 4/2014 | Park et al. | |
| 2014/0112224 A1 | 4/2014 | Jafarian et al. | |
| 2014/0112229 A1 | 4/2014 | Merlin et al. | |
| 2014/0112246 A1 | 4/2014 | Park et al. | |
| 2014/0153507 A1 | 6/2014 | Yang et al. | |
| 2014/0154985 A1 | 6/2014 | Sun | |
| 2014/0185501 A1 | 7/2014 | Park et al. | |
| 2014/0185502 A1 | 7/2014 | Kenney et al. | |
| 2014/0204822 A1* | 7/2014 | Park | H04W 68/025 370/311 |
| 2014/0229184 A1 | 8/2014 | Shires | |
| 2014/0254349 A1 | 9/2014 | Jia et al. | |
| 2014/0269462 A1 | 9/2014 | Jia et al. | |
| 2014/0269994 A1 | 9/2014 | HomChaudhuri et al. | |
| 2014/0302849 A1 | 10/2014 | Palin et al. | |
| 2014/0341234 A1* | 11/2014 | Asterjadhi | H04L 69/324 370/474 |
| 2015/0036670 A1* | 2/2015 | Park | H04W 52/0225 370/338 |
| 2015/0124677 A1* | 5/2015 | Asterjadhi | H04L 1/0025 370/311 |
| 2015/0139051 A1 | 5/2015 | Gonia et al. | |
| 2015/0334650 A1 | 11/2015 | Park | |
| 2016/0007288 A1 | 1/2016 | Samardzija et al. | |
| 2016/0105850 A1* | 4/2016 | Wentink | H04W 8/005 370/311 |
| 2016/0105863 A1 | 4/2016 | Li et al. | |
| 2016/0338086 A1* | 11/2016 | Zhou | H04W 72/1252 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Office Action for U.S. Appl. No. 14/279,820 mailed on Sep. 15, 2015, 23 pages.

Office Action for U.S. Appl. No. 15/413,726, dated Aug. 11, 2017, 26 pages.

* cited by examiner

APPARATUS, SYSTEM AND METHOD OF COMMUNICATING A WAKEUP PACKET

CROSS REFERENCE

This application claims the benefit of and priority from U.S. Provisional Patent Application No. 62/182,696 entitled "Apparatus, System and Method of Low-Power Wake-Up Receiver (LP-WUR) Signaling", filed Jun. 22, 2015, the entire disclosure of which is incorporated herein by reference.

TECHNICAL FIELD

Embodiments described herein generally relate to communicating a wakeup packet.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
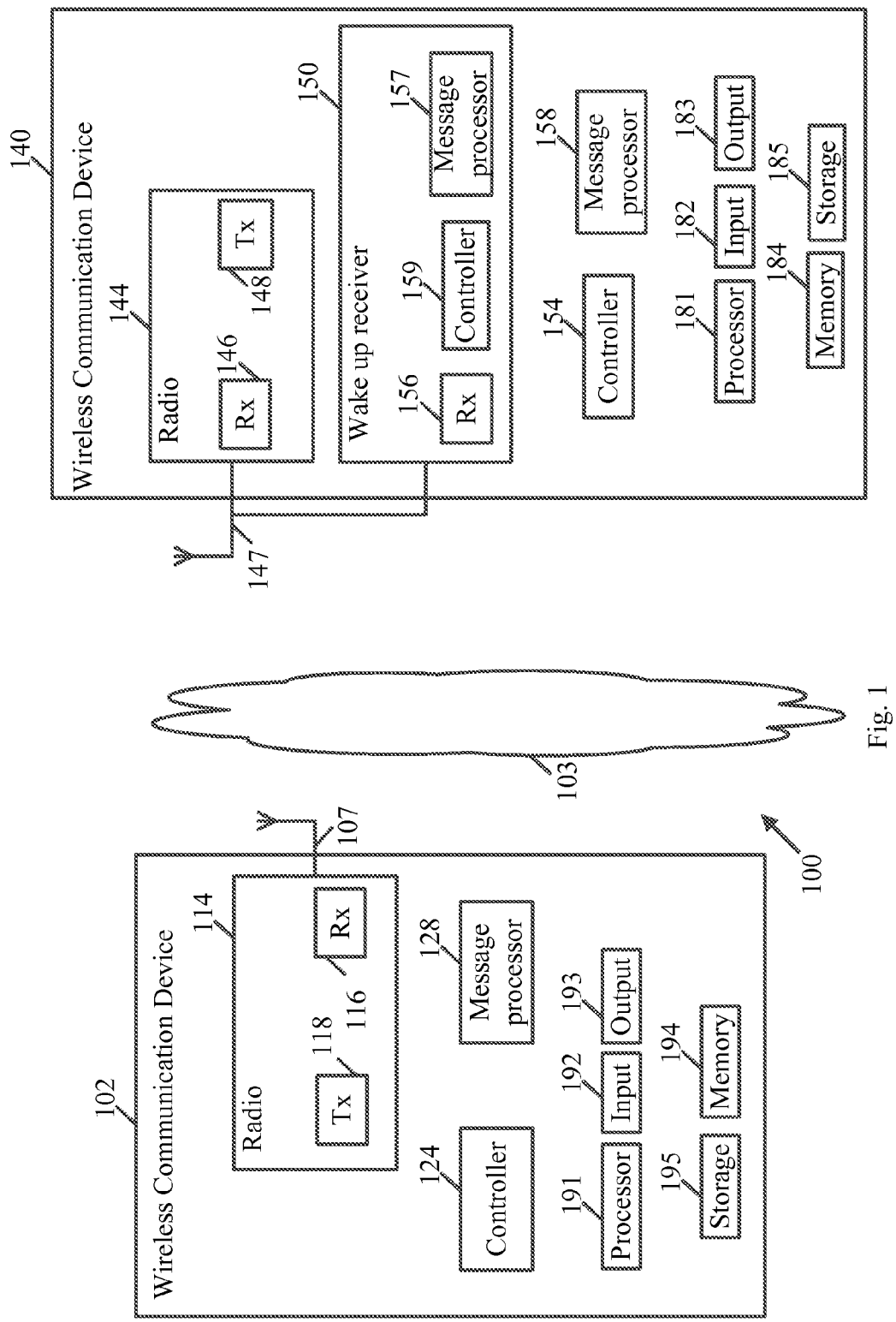
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11 ac-2013 ("*IEEE P802.11 ac-2013, IEEE Standard for Information Technology—Telecommunications and Information Exchange Between Sys-* tems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 December, 2012); IEEE-802.11REVmc ("*IEEE 802.11-REVmcm/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5, Aug. 4, 2014*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, group), and/or memory (shared, dedicated, edicated, ord group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of any other devices and/or STAs.

In some demonstrative embodiments, devices 102 and/or 140 may be configured to operate as, and/or to perform the functionality of, an access point (AP), and/or a personal basic service set (PBSS) control point (PCP), for example, an AP/PCP STA.

In some demonstrative embodiments, devices 102 and/or 140 may be configured to operate as, and/or to perform the functionality of, a non-AP STA, and/or a non-PCP STA, for example, a non-AP/PCP STA.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wake up radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wake up radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, the LP-WUR scheme, may introduce a power save mode ("LP-WUR mode"), for example, to an IEEE 802.11 Specification, e.g., as described below.

In some demonstrative embodiments, a device including an LP-WUR ("LP-WUR STA") may be configured to enter a mode ("LP-WUR mode"), e.g., in which the device is to turn off or power down a radio, e.g., an 802.11 radio, and operate the LP-WUR to wait for a wake-up packet.

In one example, device 140 including wakeup receiver 150 may be configured to enter the LP-WUR mode, in which the device 140 is to turn off or power down radio 144 radio and operate wakeup receiver 150 to wait for a wake-up packet.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wake up radio 144, for example, based on a wakeup packet received from device 102.

In one example, receiver 156 may be configured to receive the wakeup packet from device 102, message processor 156 may be configured to process the wakeup packet, and/or controller 159 may be configured to wake up radio 144.

In some demonstrative embodiments, device 102 may be configured to transmit the wakeup packet to device 140, for example, to indicate to wakeup receiver 150 that the radio 144 is to be woken up, e.g., to receive data from device 102.

In some demonstrative embodiments, controller 159 may be configured to cause radio 144 to wake up, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wake up, e.g., to switch to an active mode, for example, to transmit data to device 102 and/or to another device.

In some demonstrative embodiments, a STA, for example, an AP STA, may be configured to announce, for example, during an association process and/or a scanning and/or a discovery process, that the STA has a capability to transmit a wake-up packet.

In some demonstrative embodiments, a STA may be configured to announce, for example, during the association process and/or the scanning and/or the discovery process, that the STA can process, e.g., decode, a received wake-up packet, using the LP-WUR.

In some demonstrative embodiments, a wireless device, e.g., device 102 and/or device 140, may be configured to indicate one or more LP-WUR capabilities of the device, for example, to one or more other devices.

In some demonstrative embodiments, the one or more other devices may be configured to determine whether or not to communicate wakeup packets to the device, for example, based on the one or more LP-WUR capabilities of the wireless device.

In some demonstrative embodiments, the wireless device may be configured to generate and transmit a frame including an LP-WUR capability indication to indicate a capability of the wireless device to process communication of a wakeup packet.

In some demonstrative embodiments, the LP-WUR capability indication may indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

In some demonstrative embodiments, the LP-WUR capability of the wireless device may be indicated in an information element, for example, an Extended Capabilities element, or any other element, which may be, for example, transmitted in one or more management frames, for example, a beacon, a probe request, a probe response, an association request, an association response frame, and/or any other management message and/or frame, e.g., as described below.

In other embodiments, the LP-WUR capability of the wireless device may be transmitted in any other type of frame.

In some demonstrative embodiments, the information element may include an information field, e.g., e.g., an LP-WUR Support field, to indicate an LP-WUR capability of the device.

In some demonstrative embodiments, the LP-WUR Support field may indicate, for example, that the wireless device is capable of generating the wake-up packet, that the wireless device is capable of receiving the wake-up packet, that the wireless device is capable of both generating the wake-up packet and receiving the wake-up packet, or that the wireless device is not capable of generating the wake-up packet and receiving the wake-up packet.

In some demonstrative embodiments, the LP-WUR Support field may include a 2-bit field, e.g., as described below. In other embodiments, the LP-WUR Support field may include any other number of bits.

In some demonstrative embodiments, the LP-WUR Support field may be configured to indicate a capability of a device sending the LP-WUR Support field to transmit and/or receive a wake-up packet, e.g., as described below.

In some demonstrative embodiments, the LP-WUR Support field may have a first value, e.g., LP-WUR Support="0", to indicate that the device does not support the wake-up packet transmission and reception.

In some demonstrative embodiments, the LP-WUR Support field may have a second value, e.g., LP-WUR Support="1", to indicate that the device can only transmit wake-up packets.

In some demonstrative embodiments, the LP-WUR Support field may have a third value, e.g., LP-WUR Support="2," to indicate that the device can only receive the wake-up packets.

In some demonstrative embodiments, the LP-WUR Support field may have a fourth value, e.g., LP-WUR Support="3", to indicate that the device can transmit and receive the wake-up packets.

In some demonstrative embodiments, controller 124 may control, cause and/or trigger device 102 to generate a frame including an LP-WUR capability indication to indicate a capability of device 102 to process communication of a wakeup packet.

In some demonstrative embodiments, device 102 may be capable of transmitting the wakeup packet, e.g., as described below.

In some demonstrative embodiments, controller 124 may control, cause and/or trigger device 102 to generate the frame including the LP-WUR capability indication to indicate the capability of device 102 to transmit a wakeup packet.

In one example, device 102 may include, operate as, and/or perform the functionality of an access point (AP) configured to wake up one or more other devices, e.g., device 140, and to communicate data with the other devices, e.g., when the other devices are woken up.

In some demonstrative embodiments, controller 124 may control, cause and/or trigger device 102 to transmit the frame.

In some demonstrative embodiments, controller 124 may control, cause and/or trigger message processor 128 to generate the frame including the LP-WUR capability, and/or controller 124 may control, cause and/or trigger transmitter 118 to transmit the frame.

In some demonstrative embodiments, controller 124 may control, cause and/or trigger device 102 to process a received frame from device 140.

In some demonstrative embodiments, the received frame may include the LP-WUR capability indication indicating device 140 is capable of receiving wakeup packets.

In some demonstrative embodiments, controller 124 may control, cause and/or trigger device 102 to transmit to device 140 the wakeup packet to wakeup radio 144 of device 140.

In some demonstrative embodiments, the received frame from device 140 may include a probe request frame, or an association request frame, e.g., as described below.

In some demonstrative embodiments, the frame transmitted from device 102 to device 140 may include a beacon frame, a probe response frame, or an association response frame, e.g., as described below.

In some demonstrative embodiments, controller 144 may control, cause and/or trigger device 140 to generate a frame including an LP-WUR capability indication to indicate a capability of device 140 to process communication of a wakeup packet.

In some demonstrative embodiments, device 140 may be capable of receiving the wakeup packet, e.g., as described below.

In some demonstrative embodiments, controller 144 may control, cause and/or trigger device 140 to generate the frame including the LP-WUR capability indication to indicate the capability of device 140 to receive a wakeup packet.

In one example, device 140 may include, operate as, and/or perform the functionality of a STA configured to be woken up, for example, when data is pending for device 140.

In some demonstrative embodiments, controller 144 may control, cause and/or trigger device 140 to transmit the frame.

In some demonstrative embodiments, controller 144 may control, cause and/or trigger message processor 158 to generate the frame including the LP-WUR capability, and/or controller 144 may control, cause and/or trigger transmitter 148 to transmit the frame.

In some demonstrative embodiments, controller 154 may control, cause and/or trigger device 140 to process a received frame from device 102.

In some demonstrative embodiments, the received frame may include the LP-WUR capability indication indicating device 102 is capable of transmitting wakeup packets.

In some demonstrative embodiments, controller 154 may control, cause and/or trigger device 140 to process reception of the wakeup packet from device 102.

In some demonstrative embodiments, controller 154 may control, cause and/or trigger wakeup receiver 150 to process reception of the wakeup packet from device 102.

In some demonstrative embodiments, controller 154 may control, cause and/or trigger device 140 to wakeup radio 144 of device 140.

In some demonstrative embodiments, the received frame from device 102 may include a probe response frame, a beacon frame, or an association response frame, e.g., as described below.

In some demonstrative embodiments, the frame transmitted from device 140 to device 102 may include a probe request frame, or an association request frame, e.g., as described below.

In some demonstrative embodiments, devices 102 and 140 may exchange capability indications of device 102 and/or device 140 as part of a discovery procedure and/or a scanning process, for example, as part of a probe request and/or a probe response packet exchange between devices 102 and 140, e.g., as described below with reference to FIG. 2.

In some demonstrative embodiments, controller 154 may control, cause and/or trigger transmitter 148 to transmit a probe request frame.

In some demonstrative embodiments, the probe request frame may include the LP-WUR capability indication indicating device 140 is capable of receiving wakeup packets.

In some demonstrative embodiments, controller 124 may control, cause and/or trigger receiver 116 to process the probe request frame received from device 140, e.g., including the LP-WUR capability indication indicating that device 140 is capable of receiving wakeup packets.

In some demonstrative embodiments, controller 124 may control, cause and/or trigger transmitter 118 to transmit a probe response frame to device 140.

In some demonstrative embodiments, the probe response frame may include the LP-WUR capability indication indicating device 102 is capable of transmitting wakeup packets.

In some demonstrative embodiments, controller 154 may control, cause and/or trigger receiver 146 to process the probe response frame received from device 102, e.g., including the LP-WUR capability indication indicating that device 102 is capable of transmitting wakeup packets.

In some demonstrative embodiments, controller 154 may control, cause and/or trigger device 140 to switch to an LP-WUR mode in which radio 144 of device 140 is to be at a power-save mode.

In one example, device 140 may switch to an LP-WUR mode, e.g., after reception of the probe response frame from device 102, for example, to reduce power consumption of device 140, until data is pending for device 140.

In some demonstrative embodiments, controller 124 may control, cause and/or trigger transmitter 118 to transmit a wakeup packet to wakeup device 140.

In one example, transmitter 118 may transmit the wakeup packet to device 140, for example, when data for device 140 is pending at device 102.

In some demonstrative embodiments, controller 159 may control, cause and/or trigger wakeup receiver 150 to process the wakeup packet from device 102.

In some demonstrative embodiments, controller 159 may control, cause and/or trigger device 140 to wakeup radio 144, for example, to receive from device 102 data pending for device 140.

In some demonstrative embodiments, devices 102 and 140 may exchange capability indications of device 102 and/or device 140 as part of an association procedure, for example, as part of a beacon frame, an association request, and/or an association response packet exchange between devices 102 and 140, e.g., as described below with reference to FIG. 2.

In some demonstrative embodiments, controller 124 may control, cause and/or trigger transmitter 118 to transmit a beacon frame.

In some demonstrative embodiments, the beacon frame may include the LP-WUR capability indication indicating device 102 is capable of transmitting wakeup packets.

In some demonstrative embodiments, controller 154 may control, cause and/or trigger transmitter 148 to transmit an association request frame to device 102.

In some demonstrative embodiments, the association request frame may include the LP-WUR capability indication indicating device 140 is capable of receiving wakeup packets.

In some demonstrative embodiments, controller 124 may control, cause and/or trigger receiver 116 to process the association request frame including the indication that device 140 is capable of receiving wakeup packets.

In some demonstrative embodiments, controller 124 may control, cause and/or trigger transmitter 118 to transmit to device 140 an association response frame.

In some demonstrative embodiments, the association response frame may include the LP-WUR capability indication indicating device 102 is capable of transmitting wakeup packets.

In some demonstrative embodiments, controller 154 may control, cause and/or trigger receiver 146 to process the association response frame from device 102 indicating that device 102 is capable of transmitting wakeup packets.

In some demonstrative embodiments, controller 154 may control, cause and/or trigger device 140 to switch to the LP-WUR mode in which radio 144 is to be at the power-save mode.

In one example, device 140 may switch to an LP-WUR mode, e.g., after reception of the association response frame from device 102, for example, to save power consumption of device 140, until data is pending for device 140.

In some demonstrative embodiments, controller 124 may control, cause and/or trigger transmitter 118 to transmit a wakeup packet to wakeup device 140.

In one example, transmitter 118 may transmit the wakeup packet to device 140, for example, when data for device 140 is pending at device 102.

In some demonstrative embodiments, controller 159 may control, cause and/or trigger wakeup receiver 150 to process the wakeup packet from device 102.

In some demonstrative embodiments, controller 159 may control, cause and/or trigger device 140 to wakeup radio 144, for example, to receive from device 102 data pending for device 140.

Figure 2:
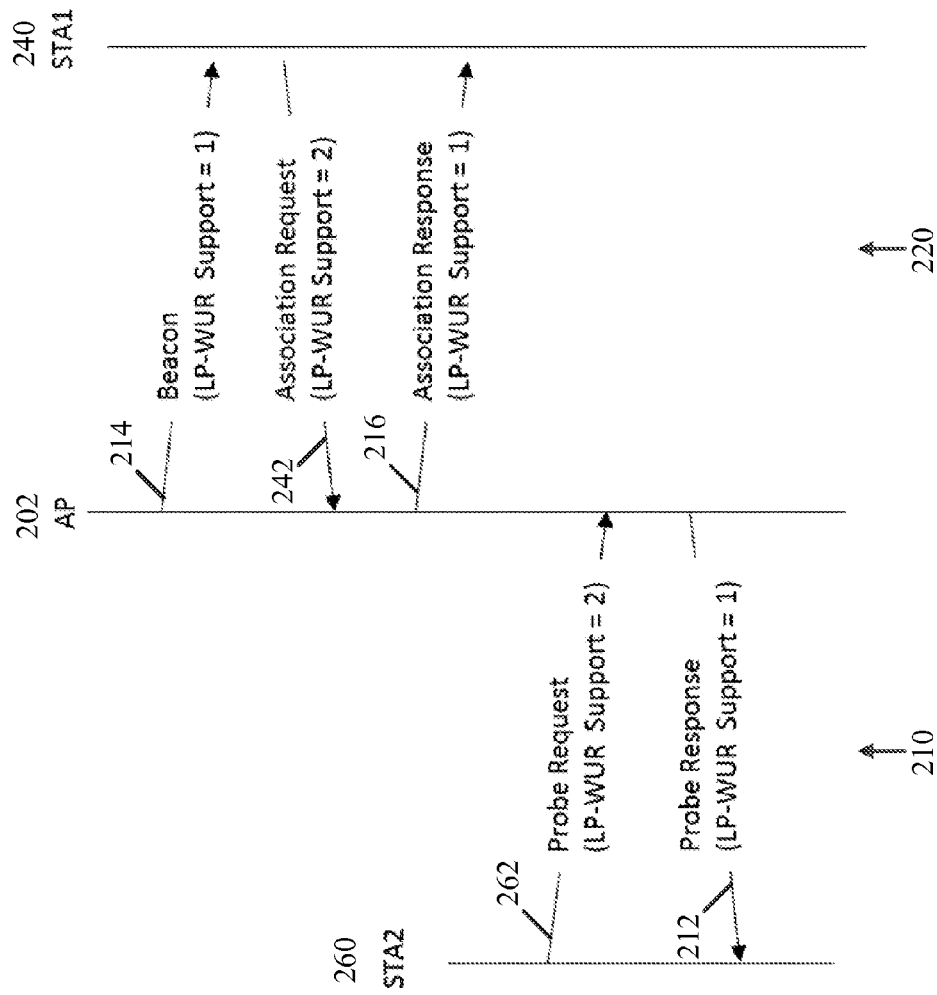
FIG. 2 is a schematic sequence diagram of operations between wireless devices, in accordance with some demonstrative embodiments.

Reference is made to FIG. 2, which schematically illustrates a sequence diagram 200 of operations between wireless devices 202, 240 and 260, in accordance with some demonstrative embodiments. For example, device 202 may perform the functionality of device 102 (FIG. 1), and/or device 240 and/or device 260 may perform the functionality of device 140 (FIG. 1).

In some demonstrative embodiments, devices 202, 240 and/or 260 may perform one or more of the operations of sequence diagram 200, for example, to communicate LP-WUR capability indications between devices 202, 240 and/or 260.

As shown in FIG. 2, device 202 may include, operate as, and/or perform the functionality of an AP, and/or devices 240 and/or 260 may include, operate as, and/or perform the functionality of a STA, e.g., a non-AP STA.

In some demonstrative embodiments, as shown in FIG. 2, device 202 may set the LP-WUR Support field to "2" in a frame transmitted by device 102, e.g., a beacon, an association response, a probe response, or any other frame, for example, to indicate that device 102 is capable of transmitting wakeup packets, e.g., as described above.

In some demonstrative embodiments, as shown in FIG. 2, device 240 and/or device 260, may set the LP-WUR Support field to "1" in a frame transmitted from device 240 and/or device 260, for example, a probe request, an association request frame, or any other frame, for example, to indicate that device 240 and/or device 260 are capable of receiving wakeup packets, e.g., as described above.

As shown in FIG. 2, device 202 and device 260 may communicate the LP-WUR capability indications as part of a discovery/scanning process 210 between devices 202 and 260.

As shown in FIG. 2, device 260 may transmit to device 202 a probe request frame 262 including the LP-WUR support field set to the third value, e.g., LP-WUR Support=2, to indicate that device 260 is capable of receiving wakeup packets.

As shown in FIG. 2, device 202 may receive the probe request frame 262, and may transmit to device 260 a probe response frame 212, e.g., in response to probe request frame 262.

As shown in FIG. 2, probe response frame 212 may include the LP-WUR support field set to the second value, e.g., LP-WUR Support=1, to indicate that device 202 is capable of transmitting wakeup packets.

In some demonstrative embodiments, device 202 may be aware of the LP-WUR capability of device 260, and/or device 260 may be aware of the LP-WUR capability of device 202, e.g., after devices 202 and 240 exchange probe request frame 262, and/or probe response frame 212.

In some demonstrative embodiments, device 202 and device 260 may be capable to implement an LP-WUR scheme during which device 202 wakes up device 260, e.g., after devices 202 and 240 exchange probe request frame 262 and/or probe response frame 212.

As shown in FIG. 2, device 202 and device 260 may communicate the LP-WUR capability indications as part of an association process 220 between devices 202 and 240.

As shown in FIG. 2, device 202 may transmit, e.g., broadcast, a beacon frame 214 including the LP-WUR support field set to the second value, e.g., LP-WUR Support=1, to indicate that device 202 is capable of transmitting wakeup packets.

As shown in FIG. 2, device 240 may receive the beacon frame 214, and may transmit to device 202 an association request frame 242 including the LP-WUR support field set to the third value, e.g., LP-WUR Support=2, to indicate that device 240 is capable of receiving wakeup packets.

As shown in FIG. 2, device 202 may receive the association request frame 242 including the LP-WUR support field set to the third value, and may transmit to device 240 an association response frame 216, e.g., in response to association request frame 242.

As shown in FIG. 2, association response frame 216 may include the LP-WUR support field set to the second value, e.g., LP-WUR Support=1, to indicate that device 202 is capable of transmitting wakeup packets.

In some demonstrative embodiments, device 202 may be aware of the LP-WUR capability of device 240, and/or device 240 may be aware of the LP-WUR capability of device 202, e.g., after devices 202 and 240 exchange beacon frame 214, association request frame 222, and/or association response frame 216.

In some demonstrative embodiments, after devices 202 and 240 exchange beacon frame 214, association request frame 222, and/or association response frame 216, devices 202 and 240 may be capable to implement a LP-WUR scheme during which device 202 may wake up device 240, e.g., after devices 202 and 240 exchange beacon frame 214, association request frame 222, and/or association response frame 216.

Referring back to FIG. 1, in some demonstrative embodiments, a STA including a LP-WUR ("LP-WUR STA"), e.g., the STA implemented by device 140, may be configured to generate and transmit an indication ("LP-WUR mode indication") to indicate that the STA is to enter a mode ("LP-WUR mode"), e.g., in which the STA is to turn off or power down a radio, e.g., an 802.11 radio, and operate the LP-WUR to wait for a wake-up packet. The STA may be configured to send the LP-WUR mode indication, for example, prior to the STA entering the LP-WUR mode.

In some demonstrative embodiments, a STA, e.g., device 102, may be configured to process a received message from the LP-WUR STA including the LP-WUR mode indication. For example, the STA may be configured to transmit a wake-up packet to the LP-WUR STA, e.g., as described below.

In some demonstrative embodiments, a STA, e.g., device 140, may be configured to indicate that it is entering the LP-WUR mode, for example, in which a radio, e.g., an IEEE 802.11 radio, is to be powered off or powered down, and the LP-WUR is to be active.

In one example, device 140 may be configured to indicate that it is entering the LP-WUR mode, for example, in which radio 144 is to be powered off or powered down and wakeup receiver 150 is to be active; and/or device 102 may be configured to receive and process the indication and to transmit a wake-up packet to wakeup device 140.

In some demonstrative embodiments, the LP-WUR STA may be configured to indicate that it is entering the LP-WUR mode, for example, by transmitting a frame, for example, a management frame or a data frame, or any other frame, which may include LP-WUR mode information, e.g., as described below.

In some demonstrative embodiments, devices 102 and/or 140 may be configured to transmit a LP-WUR indication, and/or to process a received LP-WUR indication from another device, e.g., as described below.

In some demonstrative embodiments, an action frame, e.g., an LP-WUR Power Save frame, may be configured to indicate the LP-WUR mode, e.g., as described below.

In some demonstrative embodiments, controller 144 may be configured to control, cause and/or trigger message generator 158 to generate a Low-Power Wakeup-Receiver (LP-WUR) Power Save (PS) frame to indicate an LP-WUR mode in which radio 144 of device 140 is to be at a power-save mode.

In some demonstrative embodiments, controller 144 may be configured to control, cause and/or trigger transmitter 148 to transit the LP-WUR Power Save frame to device 102.

In some demonstrative embodiments, controller 124 may control, cause and/or trigger receiver 118 to process the received LP-WUR Power Save frame from device 140 indicating the LP-WUR mode.

In some demonstrative embodiments, controller 144 may be configured to control, cause and/or trigger device 140 to switch to the LP-WUR mode.

For example, controller 144 may be configured to control, cause and/or trigger device 140 to switch radio 144 to the power save mode, for example, while wakeup receiver 150 remains active.

In some demonstrative embodiments, controller 144 may control, cause and/or trigger device 140 to switch to the LP-WUR mode, for example, upon device 102 acknowledging receipt of the LP-WUR Power Save frame.

In some demonstrative embodiments, controller 124 may control, cause and/or trigger transmitter 118 to transmit a wakeup packet to device 140.

In one example, transmitter 118 may transmit the wakeup packet to device 140, for example, when data is pending to device 140.

In some demonstrative embodiments, wakeup receiver 150 may receive the wakeup packet from device 102.

In some demonstrative embodiments, controller 144 may control, cause and/or trigger device 140, e.g., upon receipt of the wakeup packet at wake receiver 150, to switch radio 144 to an active mode, and to transmit a frame to indicate that the radio 144 is ready to receive data.

In some demonstrative embodiments, the frame transmitted from device 140 to device 102 to indicate that that the radio 144 is ready to receive data may include a PS-Poll frame, a data frame, a null data frame, and/or any other frame.

In some demonstrative embodiments, controller 124 may control, cause and/or trigger receiver 116 to process the frame from device 140 indicating that radio 144 is ready to receive data.

In some demonstrative embodiments, devices 102 and 140 may communicate the data.

In some demonstrative embodiments, the LP-WUR Power Save frame may include one or more fields corresponding to the LP-WUR mode, e.g., as follows:

TABLE 1

| Order | Information |
| --- | --- |
| 1 | Category |
| 2 | HE Action |
| 3 | LP-WUR Control |
| 4 | LP-WUR Channel |
| 5 | LP-WUR Operating Class |
| 6 | LP-WUR Preamble Length |

In some demonstrative embodiments, the LP-WUR Power Save frame may include a category field to indicate a category of the LP-WUR Power Save frame.

In one example, the Category field may be set to a value for High Efficiency (HE).

In some demonstrative embodiments, the LP-WUR Power Save frame may include an HE Action field.

In one example, the HE Action field may be set to a value for LP-WUR Power Save.

In some demonstrative embodiments, the LP-WUR Power Save frame may include an LP-WUR Control field.

In some demonstrative embodiments, the LP-WUR Control field may include one or more fields corresponding to the LP-WUR mode, e.g., as described below with reference to FIG. 3.

Figure 3:
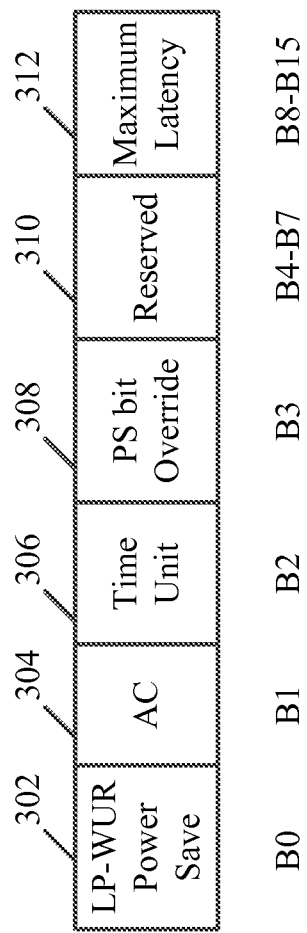
FIG. 3 is a schematic illustration of a low-power wakeup receiver (LP-WUR) control field, in accordance with some demonstrative embodiments.

Reference is made to FIG. 3, which schematically illustrates an LP-WUR control field 300, in accordance with some demonstrative embodiments.

In some demonstrative embodiments, device 140 (FIG. 1) may transmit an LP-WUR Power Save frame including LP-WUR control field 300 to indicate the LP-WUR mode, and to indicate that device 140 (FIG. 1) is to wait to receive a wakeup packet.

In some demonstrative embodiments, LP-WUR control field 300 may include a LP-WUR Power Save field 302 to indicate the LP-WUR mode.

In some demonstrative embodiments, the LP-WUR Power Save field 302 may be set by a device equipped with an LP-WUR to a first value, e.g., 1, for example, when the device is entering the LP-WUR mode, e.g., by turning off a 802.11 radio of the device and having the LP-WUR wait for a wake-up packet. The LP-WUR Power Save field may be set to a second value, e.g., 0, otherwise. For example, controller 154 (FIG. 1) may control, cause and/or trigger device 140 (FIG. 1) to set the LP-WUR Power Save field 302 to the value of "1", for example, when device 140 (FIG. 1) enters the LP-WUR mode, e.g., by turning off radio 144 (FIG. 1) and having the wakeup receiver 150 (FIG. 1) wait for a wake-up packet.

In some demonstrative embodiments, LP-WUR control field 300 may include an Access Category (AC) field 304, In some demonstrative embodiments, AC field 304 may include a first value or a second value. In other embodiments, AC field 304 may include any other additional and/or alternative value.

In some demonstrative embodiments, the first value may indicate a first latency to transmit the wakeup packet, for example, when data of at least one first access category is pending for device 140 (FIG. 1).

In some demonstrative embodiments, the second value may indicate a second latency to transmit the wakeup packet, for example, when data of at least one second access category is pending for device 140 (FIG. 1).

In some demonstrative embodiments, the second latency may be shorter than the first latency.

In some demonstrative embodiments, the at least one first access category may include a best effort access category and a background access category. In other embodiments, the at least one first access category may include any other additional and/or alternative access category.

In some demonstrative embodiments, the at least one second access category may include a video access category and a voice access category.

In some demonstrative embodiments, LP-WUR control field 300 may include timing information to indicate the first latency. In other embodiments, the at least one second access category may include any other additional and/or alternative access category.

In some demonstrative embodiments, LP-WUR control field 300 may include a time unit field 306 indicating a time unit.

In one example, the time unit field may be set to a first value, e.g., 0, to indicate a first time unit, e.g., milliseconds, or to a second value, e.g., 1, to indicate a second time unit, e.g., seconds. In other embodiments, the time unit field may include any other additional and/or alternative value.

In some demonstrative embodiments, LP-WUR control field 300 may include a maximal latency field 312 including a value representing the first latency in terms of the time unit of time unit field 306.

In some demonstrative embodiments, the Maximum Latency field 312 may include a value, denoted T, to indicate a maximum latency, for example, from reception of data for device 140 (FIG. 1) at an other STA, e.g., device 102 (FIG. 1), until a wake-up packet is to be transmitted from the other STA to device 140 (FIG. 1), e.g., as described below.

In some demonstrative embodiments, the latency value T may indicate the latency as T time units, in terms of the time unit of time unit field 306.

In one example, Access Category (AC) field 304 may be set to a first value, e.g., 1, for example, to indicate that device 140 (FIG. 1) is to receive from another device, for example, an AP, e.g., device 102, a first type of data, e.g., latency sensitive data, for example, as soon as data frames arrive at the AP.

In some demonstrative embodiments, Access Category (AC) field 304 may be set to a second value, e.g., 0, for example, to indicate that device 140 (FIG. 1) is to receive from the AP a second type of data, e.g., latency insensitive data, with a latency of no more than the latency set in the Maximum Latency field.

In some demonstrative embodiments, the AC field may be set to 0, for example, when a station indicates that when a frame that is destined for the device arrives at the AP, a wake-up packet is to be scheduled to be transmitted within T time-units, where T is defined in the Maximum Latency field.

In one example, the AP, e.g., device 102, may be configured to wake up device 140 (FIG. 1) as soon as a frame categorized as Access Category Voice (AC_VO) or Access Category Video (AC_VI) arrives at the AP, e.g., to minimize the latency. However, when a frame that is categorized as Access Category Best Effort (AC_BE) or Access Category Background (AC_BK) arrives at the AP, the AP may be configured to wake up device 140 (FIG. 1) within the T time-units.

In some demonstrative embodiments, LP-WUR control field 300 may include a Power Save (PS) Override field 308.

In some demonstrative embodiments, PS Override field 308 may include a predefined value to indicate whether or not a PS bit in a frame control field of a message is to indicate device 140 (FIG. 1) is to be switched to the LP-WUR mode.

In some demonstrative embodiments, the message to indicate device 140 (FIG. 1) is to be switched to the LP-WUR mode may include a PS-Poll frame, a data frame, or a null data frame.

In other embodiments, the message to indicate device 140 (FIG. 1) is to be switched to the LP-WUR mode may include any other message.

In one example, PS Override field 308 may be configured to indicate, for example, whether or not a PS bit, for example, a PS bit in a Frame Control field or any other field of a message, may be used to indicate that device 140 (FIG. 1) is entering the LP-WUR mode, for example, instead of sending a separate LP-WUR Power save frame, e.g., as described below.

In some demonstrative embodiments, controller 144 (FIG. 1) may control, cause and/or trigger transmitter 148 (FIG. 1) to transmit an LP-WUR Power Save frame including the PS Override field 308 set to a first predefined value, e.g., "1", to indicate the PS bit in the frame control field of a message is to indicate device 140 (FIG. 1) is to be switched to the LP-WUR mode.

In some demonstrative embodiments, controller 144 (FIG. 1) may control, cause and/or trigger device 140 (FIG. 1) to switch to the LP-WUR mode.

In some demonstrative embodiments, wakeup receiver 150 (FIG. 1) may receive a wakeup frame and may switch radio 144 (FIG. 1) to the active mode.

In some demonstrative embodiments, controller 144 (FIG. 1) may control, cause and/or trigger device 140 (FIG. 1), e.g., after switching radio 144 (FIG. 1) to the active mode, to transmit the message including the PS bit indicating radio 144 (FIG. 1) is to be switched to the LP-WUR mode, e.g. instead of transmitting the LP-WUR Power Save frame, and to switch radio 144 (FIG. 1) to the LP-WUR mode, e.g., as described below with reference to FIG. 5.

In some demonstrative embodiments, using the PS bit of the message to indicate that radio 144 (FIG. 1) is to be switched to the LP-WUR mode may save bandwidth.

In some demonstrative embodiments, the PS bit in the Frame Control field of the message may be set to a first value, e.g., "1" to indicate radio 144 (FIG. 1) is to be switched to the LP-WUR mode.

In some demonstrative embodiments, the PS bit in the Frame Control field of the message may be set to a second value, e.g., "0", for example, to indicate that device 140 (FIG. 1) is in the active state and will remain active, for example, until device 140 (FIG. 1) sends the message frame with the PS bit set to "1".

In some demonstrative embodiments, PS Override field 308 may not be set to a second predefined value, e.g., PS Override field 308 may be set to "0", and device 140 (FIG. 1) may use the LP-WUR Power Save frame to indicate the LP-WUR mode, e.g., as described below with reference to FIG. 4.

In some demonstrative embodiments, LP-WUR control field 300 may include at least one reserved field 310, for example, to be reserved for future use.

Referring back to FIG. 1, in some demonstrative embodiments, the LP-WUR Power Save frame, e.g., of Table 1, may include an LP-WUR Channel field to indicate a channel to communicate the wakeup packet.

In one example, the LP-WUR Channel field may have a predefined length, e.g., 1 octet, and may include a channel number to communicate the wakeup packet.

In some demonstrative embodiments, the LP-WUR Power Save frame may include an LP-WUR Operating Class field, e.g., having a length of 1 octet, configured to specify the operating class of LP-WUR channel.

In one example, a station may operate in a first band, e.g., the 5 GHz band, while the wake-up packet may be transmitted and received on a channel of a second band, e.g., one of the 2.4 GHz channels, for example, in order to reduce the power consumption of the LP-WUR.

In some demonstrative embodiments, the LP-WUR Power Save frame may include an LP-WUR Preamble Length field, e.g., having a length of 1 octet, configured indicate a length of a preamble of the wakeup packet.

In one example, a reduced length of the preamble of the wake-up packet may be used, e.g., to reduce overhead, for example, when a station to receive the wakeup packet is located near a transmitter of the wakeup packet.

In some demonstrative embodiments, device 102 may receive the LP-WUR Power Save frame including one or more of the fields of Table 1 and/or the LP-WUR control field 300 (FIG. 3).

In some demonstrative embodiments, device 102 may transmit a wakeup frame to device 140, for example, based on one or more of the fields of Table 1 and/or the LP-WUR control field 300 (FIG. 3), for example, which may be included in the LP-WUR Power Save frame from device 102, e.g., as described below.

In some demonstrative embodiments, controller 124 may control, cause and/or trigger device 102 to transmit the wakeup packet to device 140 over the channel, e.g., indicated by the LP-WUR Channel field of the LP-WUR Power Save frame.

In some demonstrative embodiments, controller 124 may control, cause and/or trigger device 102 to transmit the wakeup packet to device 140, e.g., over a band indicated by the LP-WUR Operating Class field of the LP-WUR Power Save frame.

In some demonstrative embodiments, controller 124 may control, cause and/or trigger device 102 to generate the wakeup packet including a preamble having a length, e.g., a length indicated by the LP-WUR Preamble Length field of the LP-WUR Power Save frame.

In some demonstrative embodiments, controller 124 may control, cause and/or trigger device 102 to transmit the wakeup packet based on the first latency, e.g. when data of the first access category is pending for device 140, and the Access AC field 304 (FIG. 3) of the LP-WUR Power Save frame is set to the first value.

In one example, controller 124 may control, cause and/or trigger device 102 to transmit the wakeup packet as soon as latency sensitive data, e.g., video data or audio data is pending for device 140.

In some demonstrative embodiments, controller 124 may control, cause and/or trigger device 102 to transmit the wakeup packet based on the second latency, e.g., indicated at maximal latency field 312 (FIG. 3), for example, when data of the second access category is pending for device 140, and the Access AC field 304 (FIG. 3) of the LP-WUR Power Save frame is set to the second value.

In one example, controller 124 may control, cause and/or trigger device 102 to transmit the wakeup packet within the value T of the maximum latency, for example, when latency insensitive data, e.g., a best effort access category data or a background access category data, is pending for device 140.

In some demonstrative embodiments, controller 124 may control, cause and/or trigger device 102 to process the LP-WUR Power Save frame including PS override field 308 (FIG. 3) including the first predefined value, e.g., indicating that a PS bit in a frame control field of a message from device 140 is to indicate that device 140 is to be switched to the LP-WUR mode.

In some demonstrative embodiments, controller 124 may control, cause and/or trigger device 102 to process the frame from device 140 to indicate that radio 144 is ready to receive data.

In some demonstrative embodiments, controller 124 may control, cause and/or trigger device 102 to communicate data with device 140.

In some demonstrative embodiments, controller 124 may control, cause and/or trigger device 102 to process a message received from device 140, the message including the PS bit indicating device 140 is to be switched to the LP-WUR mode, e.g., instead of the LP-WUR Power Save frame.

In some demonstrative embodiments, controller 124 may control, cause and/or trigger device 102, e.g., after receiving the message, to transmit another wakeup packet to device 140, e.g., to wakeup device 140 to communicate data with device 140.

In some demonstrative embodiments, controller 124 may control, cause and/or trigger device 102 to process the LP-WUR Power Save frame including PS override field 308 (FIG. 3) including the second predefined value, e.g., indicating that only the LP-WUR Power Save frame is to indicate that device 140 is to be switched to the LP-WUR mode.

In some demonstrative embodiments, controller 124 may control, cause and/or trigger device 102 to process the LP-WUR Power Save frame to indicate that device 140 is to be switched to the LP-WUR mode.

Figure 4:
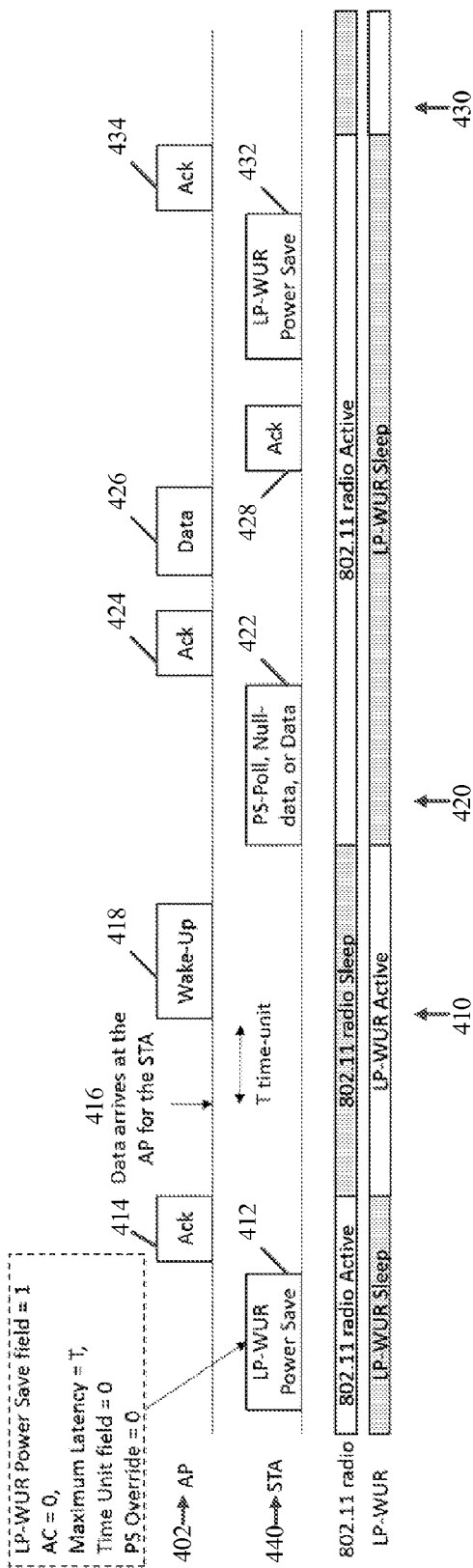
FIG. 4 is a schematic illustration of communications between an Access Point (AP) and a wireless station (STA), in accordance with some demonstrative embodiments.

Reference is made to FIG. 4, which schematically illustrates communications between an Access Point (AP) 402 and a wireless station (STA) 440, in accordance with some demonstrative embodiments. In one example, AP 402 may perform the functionality of device 102 (FIG. 1), and/or STA 440 may perform the functionality of device 140 (FIG. 1).

In some demonstrative embodiments, one or more of the communications of FIG. 4 may be performed, for example, when a PS Override field of an LP-WUR Power Save frame, e.g., PS override field 308 (FIG. 3), is set to a value, e.g. "0", indicating that an LP-WUR Power Save frame is to indicate that STA 440 is to enter the LP-WUR mode, e.g., as described below.

As shown in FIG. 4, In some demonstrative embodiments, before STA 440 enters an LP-WUR mode 410, STA 440 may transmit a LP-WUR Power Save frame 412 to AP 402.

As shown in FIG. 4, the LP-WUR Power Save frame 412 may include the LP-WUR Power Save field 302 (FIG. 3) of the LP-WUR Control field 300 (FIG. 3) set to 1, e.g., to indicate that STA 440 is to enter the LP-WUR mode.

As shown in FIG. 4, the LP-WUR Power Save frame 412 may include the Maximum Latency field 312 (FIG. 3) set to T.

As shown in FIG. 4, the LP-WUR Power Save frame 412 may include the PS override field 308 (FIG. 3) set to '0', e.g., to indicate that only an a LP-WUR Power Save frame 412 is to indicate that that STA 440 is to enter the LP-WUR mode.

In some demonstrative embodiments, as shown in FIG. 4, STA 440 may enter the LP-WUR mode 410, for example, upon receiving an Acknowledge (Ack) frame 414 from AP 402.

In one example, STA 440 may turn on an LP-WUR of the STA 440, turn off a radio, e.g., an IEEE 802.11 radio, of the STA 440, and wait for a wake-up packet to be received to wake up the radio.

In some demonstrative embodiments, as shown in FIG. 4, when data is pending to be transmitted to STA 440, AP 402 may schedule a wake-up packet 418 to be transmitted to AP 402, e.g., within T time-units.

In some demonstrative embodiments, as shown in FIG. 4, AP 402 may transmit the wake-up packet 418, e.g., once AP 402 acquires the medium.

In some demonstrative embodiments, as shown in FIG. 4, the LP-WUR of STA 440 may receive the wake-up packet 418, and may wake up (420) the radio.

In some demonstrative embodiments, as shown in FIG. 4, STA 440 may transmit to AP 402 a frame 422, for example, a PS-Poll frame, a Null-data fame, a data frame, or any other frame, for example, to indicate that the radio of STA 440 is active.

In some demonstrative embodiments, as shown in FIG. 4, when AP 402 receives the frame 422 from STA 440, AP 402 may transmit an Ack packet 424 to acknowledge receipt of the frame 422.

In some demonstrative embodiments, as shown in FIG. 4, AP 402 may transmit a data frame 426 to STA 440.

In some demonstrative embodiments, as shown in FIG. 4, when STA 440 receives the data packet 426 from AP 402, STA 440 may transmit an Ack packet 428 to AP 402 to acknowledge receipt of data packet 426.

As shown in FIG. 4, in some demonstrative embodiments, before STA 440 enters an LP-WUR mode 430, STA 440 may transmit a LP-WUR Power Save frame 432 to AP 402.

In some demonstrative embodiments, the LP-WUR Power Save frame 432 may include the LP-WUR Power Save field 302 (FIG. 3) of the LP-WUR Control field 300 (FIG. 3) set to 1, e.g., to indicate that STA 440 is to enter the LP-WUR mode.

In some demonstrative embodiments, as shown in FIG. 4, STA 440 may enter the LP-WUR mode 430, for example, upon receiving an Acknowledge (Ack) frame 434 from AP 402.

Figure 5:
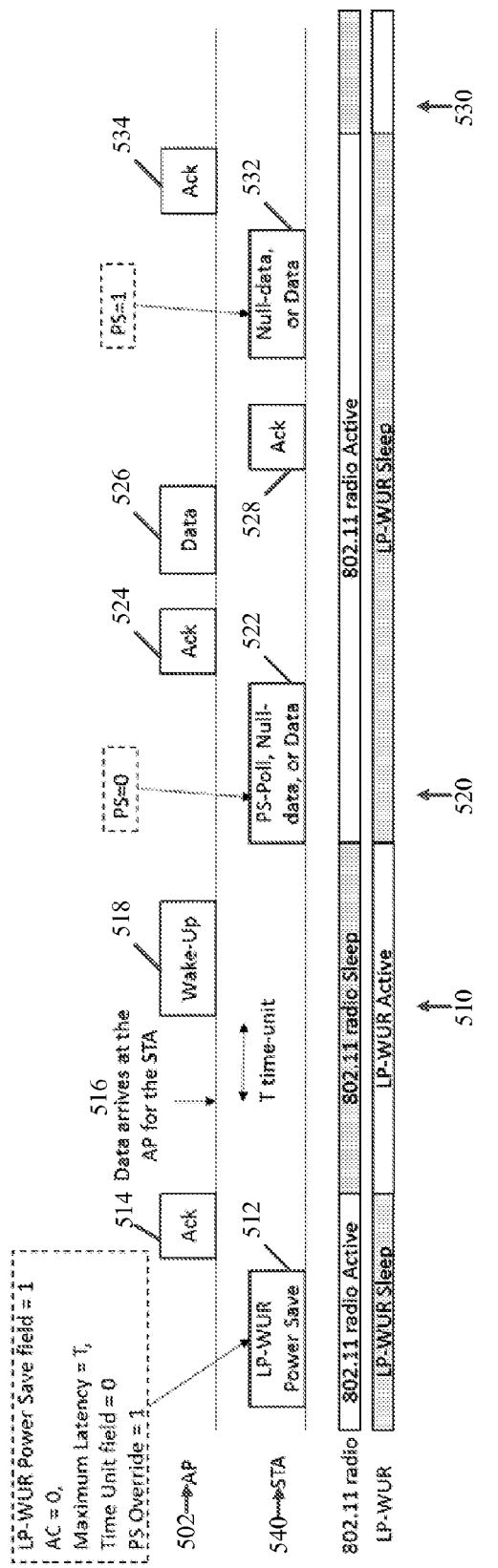
FIG. 5 is a schematic illustration of communications between an Access Point (AP) and a wireless station (STA), in accordance with some demonstrative embodiments.

Reference is made to FIG. 5, which schematically illustrates communications between an Access Point (AP) 502 and a wireless station (STA) 540, in accordance with some demonstrative embodiments. In one example, AP 502 may perform the functionality of the device 102 (FIG. 1), and/or STA 540 may perform the functionality of device 140 (FIG. 1).

In some demonstrative embodiments, one or more of the communications of FIG. 5 may be performed, for example, when a PS Override field of an LP-WUR Power Save frame, e.g., PS override field 308 (FIG. 3), is set to a predefined value, e.g. "1", to indicate that a PS bit in a frame control field of a message from STA 540 is to indicate that STA 540 is to be switched to the LP-WUR mode, for example, instead of transmitting an LP-WUR Power Save frame, e.g., as described below.

As shown in FIG. 5, in some demonstrative embodiments, before STA 540 enters an LP-WUR mode 510, STA 540 may transmit a LP-WUR Power Save frame 512 to AP 502.

As shown in FIG. 5, the LP-WUR Power Save frame 512 may include the LP-WUR Power Save field 302 (FIG. 3) of the LP-WUR Control field 300 (FIG. 3) set to 1, e.g., to indicate that STA 540 is to enter the LP-WUR mode.

As shown in FIG. 5, the LP-WUR Power Save frame 512 may include the Maximum Latency field 312 (FIG. 3) set to T.

As shown in FIG. 5, the LP-WUR Power Save frame 512 may include the PS override field 308 (FIG. 3) set to the predefined value, e.g., '1', to indicate that a PS bit in a frame control field of a message from STA 540 is to indicate that STA 540 is to be switched to the LP-WUR mode, for example, instead of transmitting an LP-WUR Power Save frame.

In some demonstrative embodiments, as shown in FIG. 5, STA 540 may enter the LP-WUR mode 510, for example, upon receiving an Acknowledge (Ack) frame 514 from AP 502.

In one example, STA 540 may turn on an LP-WUR of the STA 540, turn off a radio, e.g., an IEEE 802.11 radio, of the STA 540, and wait for a wake-up packet to be received to wake up the radio.

In some demonstrative embodiments, as shown in FIG. 5, when data is pending to be transmitted to STA 540, AP 502 may schedule a wake-up packet 518 to be transmitted to AP 502, e.g., within T time-units.

In some demonstrative embodiments, as shown in FIG. 5, AP 502 may transmit the wake-up packet 518, e.g., once AP 502 acquires the medium.

In some demonstrative embodiments, as shown in FIG. 5, the LP-WUR of STA 540 may receive the wake-up packet 518, and may wake up (520) the radio.

In some demonstrative embodiments, as shown in FIG. 5, STA 540 may transmit to AP 502 a frame 522, for example, a PS-Poll frame, a Null-data fame, a data frame, or any other frame, for example, to indicate that the radio of STA 540 is active.

In some demonstrative embodiments, as shown in FIG. 5, when AP 502 receives the frame 522 from STA 540, AP 502 may transmit an Ack packet 524 to acknowledge receipt of the frame 522.

In some demonstrative embodiments, as shown in FIG. 5, AP 502 may transmit a data frame 526 to STA 540.

In some demonstrative embodiments, as shown in FIG. 5, when STA 540 receives the data packet 526 from AP 502, STA 540 may transmit an Ack packet 528 to AP 502 to acknowledge receipt of data packet 526.

As shown in FIG. 5, in some demonstrative embodiments, before STA 540 enters an LP-WUR mode 530, STA 540 may transmit a message 532 to AP 502 to indicate that STA 540 is to be switched to the LP-WUR mode, for example, instead of transmitting an LP-WUR Power Save frame, e.g., LP-WUR Power Save frame 432 (FIG. 4).

As shown in FIG. 5, message 532 may include a PS bit set to "1" to indicate that STA 540 is to be switched to the LP-WUR mode, e.g., as described above.

As shown in FIG. 5, message 532 may include a null data frame or a data frame.

In some demonstrative embodiments, as shown in FIG. 5, STA 540 may enter the LP-WUR mode 530, for example, upon receiving an Acknowledge (Ack) frame 534 from AP 502, e.g., to acknowledge receipt of message 532.

Figure 6:
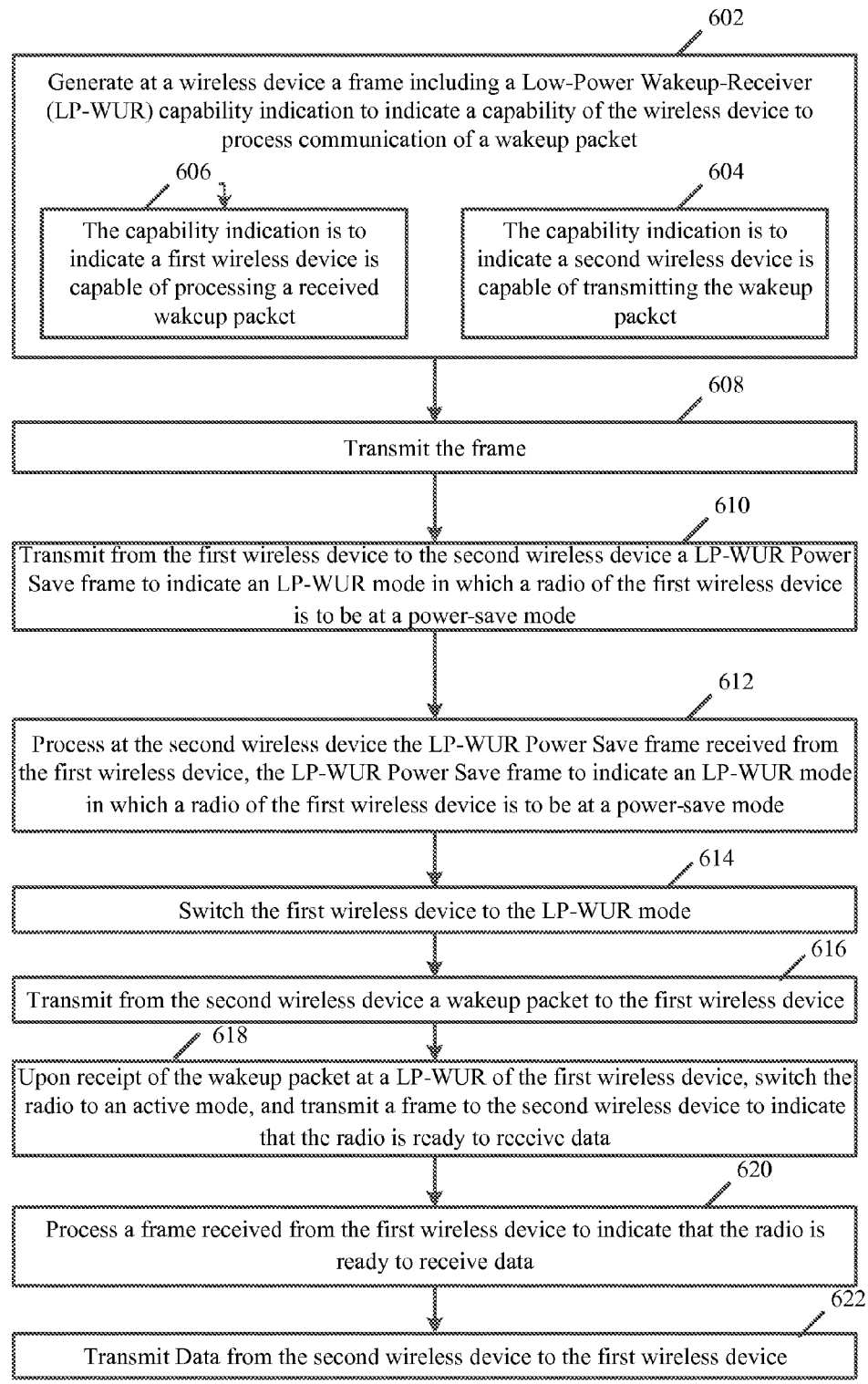
FIG. 6 is a schematic flow-chart illustration of a method of communicating a wakeup packet, in accordance with some demonstrative embodiments.

Reference is made to FIG. 6, which schematically illustrates a method of communicating a wakeup packet, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), a controller, e.g., controller 159 (FIG. 1), controller 124 (FIG. 1) and/or controller 154 (FIG. 1), a radio, e.g., radio 114 (FIG. 1) and/or radio 144 (FIG. 1), a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 602, the method may include generating at a wireless device a frame including a Low-Power Wakeup-Receiver (LP-WUR) capability indication to indicate a capability of the wireless device to process communication of a wakeup packet. For example, controller 154 (FIG. 1) may control, cause and/or trigger message processor 158 (FIG. 1) and/or radio 144 (FIG. 1) to generate the frame including the LP-WUR capability indication to indicate a capability of device 140 (FIG. 1) to process communication of the wakeup packet; and/or controller 124 (FIG. 1) may control, cause and/or trigger message processor 128 (FIG. 1) and/or radio 114 (FIG. 1) to generate the frame including the LP-WUR capability indication to indicate a capability of device 102 (FIG. 1) to process communication of the wakeup packet, e.g., as described above.

As indicated at block 606, generating the frame may include generating at a first wireless device an LP-WUR capability indication to indicate that the first wireless device is capable of processing received wakeup packets. For example, controller 154 (FIG. 1) may control, cause and/or trigger message processor 158 (FIG. 1) and/or radio 144 (FIG. 1) to generate the frame including the LP-WUR capability indication to indicate device 150 (FIG. 1) is capable of processing the received wakeup packet, e.g., as described above.

As indicated at block 604, generating the frame may include generating at a second wireless device an LP-WUR capability indication to indicate the second wireless device is capable of transmitting the wakeup packets. For example, controller 124 (FIG. 1) may control, cause and/or trigger message processor 128 (FIG. 1) and/or radio 114 (FIG. 1) to generate the frame including the LP-WUR capability indication to indicate a capability of device 102 (FIG. 1) to transmit the wakeup packet, e.g., as described above.

As indicated at block 608, the method may include transmitting the frame including the LP-WUR capability indication. For example, controller 154 (FIG. 1) may control, cause and/or trigger transmitter 148 (FIG. 1) to transmit the frame including the LP-WUR capability of device 140 (FIG. 1); and/or controller 124 (FIG. 1) may control, cause and/or trigger transmitter 118 (FIG. 1) to the frame including the LP-WUR capability of device 102 (FIG. 1), e.g., as described above.

As indicated at block 610, the method may include transmitting from the first wireless device to the second wireless device a Low-Power Wakeup-Receiver (LP-WUR) Power Save (PS) frame to indicate an LP-WUR mode in which a radio of the first wireless device is to be at a power-save mode. For example, controller 154 (FIG. 1) may control, cause and/or trigger transmitter 148 (FIG. 1) to transmit the LP-WUR power save frame to indicate the LP-WUR mode in which radio 144 (FIG. 1) is to be at the power-save mode, e.g., as described above.

As indicated at block 612, the method may include processing reception at the second wireless device of the LP-WUR power save frame. For example, controller 124 (FIG. 1) may control, cause and/or trigger receiver 116 (FIG. 1) to process reception of the LP-WUR power save frame from device 140 (FIG. 1), e.g., as described above.

As indicated at block 614, the method may include switching the first wireless device to the LP-WUR mode. For example, controller 154 (FIG. 1) may control, cause and/or trigger device 140 (FIG. 1) to switch to the LP-WUR mode, e.g., as described above.

As indicated at block 616, the method may include transmitting a wakeup packet from the second wireless device to the first wireless device. For example, controller 124 (FIG. 1) may control, cause and/or trigger transmitter 118 (FIG. 1) to transmit the wakeup packet to device 140 (FIG. 1), e.g., as described above.

As indicated at block 618, the method may include switching the radio of the first wireless device to an active mode and transmitting a frame from the first wireless device to indicate that the radio is ready to receive data, e.g., upon receipt of a wakeup packet from the second wireless device. For example, controller 154 (FIG. 1) may control, cause and/or trigger device 140 (FIG. 1) to switch radio 144 (FIG. 1) to the active mode and to transmit the frame to indicate that radio 144 (FIG. 1) is ready to receive data, for example, for example, upon receipt of the wakeup packet from device 102 (FIG. 1), e.g., as described above.

As indicated at block 620, the method may include processing receipt of the frame from the first wireless device to indicate that the radio is ready to receive data. For example, controller 12 (FIG. 1) may control, cause and/or trigger device 120 (FIG. 1) to process the frame to indicate that radio 144 (FIG. 1) is ready to receive data, e.g., as described above.

As indicated at block 622, the method may include transmitting data from the second wireless device to the first wireless device. For example, controller 124 (FIG. 1) may control, cause and/or trigger transmitter 118 (FIG. 1) to transmit data to device 140 (FIG. 1), e.g., as described above.

Figure 7:
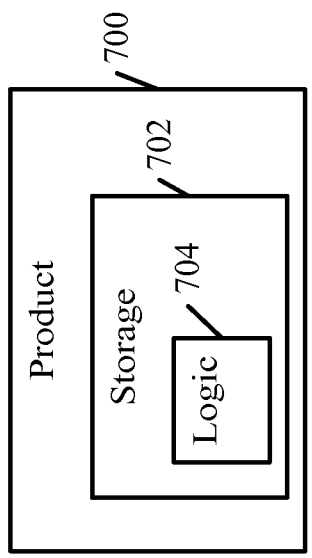
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), receiver 156 (FIG. 1), controller 124 (FIG. 1), controller 154 (FIG. 1), controller 159 (FIG. 1), message processor 128 (FIG. 1), message processor 128 (FIG. 1), and/or message processor 158 (FIG. 1), message processor 157 (FIG. 1), and/or to perform one or more operations of FIG. 2, FIG. 3, FIG. 4, and/or FIG. 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless device to generate a frame comprising a Low-Power Wakeup-Receiver (LP-WUR) capability indication to indicate a capability of the wireless device to process communication of a wakeup packet; and transmit the frame.

Example 2 includes the subject matter of Example 1, and optionally, wherein the capability indication is to indicate the wireless device is capable of transmitting the wakeup packet.

Example 3 includes the subject matter of Example 2, and optionally, wherein the apparatus is configured to cause the wireless device to operate as a first wireless device to process a received frame from a second wireless device, the received frame comprising the LP-WUR capability indication indicating the second wireless device is capable of receiving wakeup packets; and transmit to the second wireless device the wakeup packet to wakeup the second wireless device.

Example 4 includes the subject matter of Example 3, and optionally, wherein the received frame comprises a probe request frame, or an association request frame.

Example 5 includes the subject matter of any one of Examples 2-4, and optionally, wherein the frame comprises a beacon frame, a probe response frame, or an association response frame.

Example 6 includes the subject matter of Example 1, and optionally, wherein the capability indication is to indicate the wireless device is capable of processing a received wakeup packet.

Example 7 includes the subject matter of Example 6, and optionally, wherein the apparatus is configured to cause the wireless device to operate as a first wireless device to process a received frame from a second wireless device, the received frame comprising the LP-WUR capability indication indicating the second wireless device is capable of transmitting wakeup packets; process reception of the wakeup packet from the second wireless device; and wakeup a radio of the first wireless device.

Example 8 includes the subject matter of Example 7, and optionally, wherein the received frame comprises a probe response frame, a beacon frame, or an association response frame.

Example 9 includes the subject matter of Example 7 or 8, and optionally, wherein the frame comprises a probe request frame, or an association request frame.

Example 10 includes the subject matter of Example 1, and optionally, wherein the apparatus is configured to cause the wireless device to operate as a first wireless device to transmit a beacon frame comprising the LP-WUR capability indication indicating the first wireless device is capable of transmitting wakeup packets; process an association request frame received from a second wireless device, the association request frame comprising the LP-WUR capability indication indicating the second wireless device is capable of receiving wakeup packets; transmit to the second wireless device an association response frame comprising the LP-WUR capability indication indicating the first wireless device is capable of transmitting wakeup packets; and transmit to the second wireless device the wakeup packet to wakeup the second wireless device.

Example 11 includes the subject matter of Example 1, and optionally, wherein the apparatus is configured to cause the wireless device to operate as a first wireless device to process a beacon frame received from a second wireless device, the beacon frame comprising the LP-WUR capability indication indicating the second wireless device is capable of transmitting wakeup packets; transmit an association request frame to the second wireless device, the association request frame comprising the LP-WUR capability indication indicating the first wireless device is capable of receiving wakeup packets; process an association response frame received from the second wireless device, the association response frame comprising the LP-WUR capability indication indicating the second wireless device is capable of transmitting wakeup packets; process reception of the wakeup packet from the second wireless device; and wakeup a radio of the first wireless device.

Example 12 includes the subject matter of Example 1, and optionally, wherein the apparatus is configured to cause the wireless device to operate as a first wireless device to transmit a probe request frame comprising the LP-WUR capability indication indicating the first wireless device is capable of receiving wakeup packets; process a probe response frame received from a second wireless device, the probe response frame comprising the LP-WUR capability indication indicating the second wireless device is capable of transmitting wakeup packets; process reception of the wakeup packet from the second wireless device; and wakeup a radio of the first wireless device.

Example 13 includes the subject matter of Example 1, and optionally, wherein the apparatus is configured to cause the wireless device to operate as a first wireless device to process a probe request frame received from a second wireless device, the probe request frame comprising the LP-WUR capability indication indicating the second wireless device is capable of receiving wakeup packets; transmit a probe response frame to the second wireless device, the probe response frame comprising the LP-WUR capability indication indicating the first wireless device is capable of transmitting wakeup packets; and transmit the wakeup packet to wakeup the second wireless device.

Example 14 includes the subject matter of any one of Examples 1-13, and optionally, wherein the capability indication is to indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

Example 15 includes the subject matter of any one of Examples 1-14, and optionally, comprising a radio to transmit the frame.

Example 16 includes the subject matter of any one of Examples 1-15, and optionally, comprising one or more antennas, a processor, and a memory.

Example 17 includes a system of wireless communication comprising a wireless device, the wireless device comprising one or more antennas; a memory; a radio; a processor; and circuitry configured to cause the wireless device to generate a frame comprising a Low-Power Wakeup-Receiver (LP-WUR) capability indication to indicate a capability of the wireless device to process communication of a wakeup packet; and transmit the frame.

Example 18 includes the subject matter of Example 17, and optionally, wherein the capability indication is to indicate the wireless device is capable of transmitting the wakeup packet.

Example 19 includes the subject matter of Example 18, and optionally, wherein the circuitry is configured to cause the wireless device to operate as a first wireless device, the process a received frame from a second wireless device, the received frame comprising the LP-WUR capability indication indicating the second wireless device is capable of receiving wakeup packets; and transmit to the second wireless device the wakeup packet to wakeup the second wireless device.

Example 20 includes the subject matter of Example 19, and optionally, wherein the received frame comprises a probe request frame, or an association request frame.

Example 21 includes the subject matter of any one of Examples 18-20, and optionally, wherein the frame comprises a beacon frame, a probe response frame, or an association response frame.

Example 22 includes the subject matter of Example 17, and optionally, wherein the capability indication is to indicate the wireless device is capable of processing a received wakeup packet.

Example 23 includes the subject matter of Example 22, and optionally, wherein the circuitry is configured to cause the wireless device to operate as a first wireless device, the process a received frame from a second wireless device, the received frame comprising the LP-WUR capability indication indicating the second wireless device is capable of transmitting wakeup packets; process reception of the wakeup packet from the second wireless device; and wakeup a radio of the first wireless device.

Example 24 includes the subject matter of Example 23, and optionally, wherein the received frame comprises a probe response frame, a beacon frame, or an association response frame.

Example 25 includes the subject matter of Example 23 or 24, and optionally, wherein the frame comprises a probe request frame, or an association request frame.

Example 26 includes the subject matter of Example 17, and optionally, wherein the circuitry is configured to cause the wireless device to operate as a first wireless device to transmit a beacon frame comprising the LP-WUR capability indication indicating the first wireless device is capable of transmitting wakeup packets; process an association request frame received from a second wireless device, the association request frame comprising the LP-WUR capability indication indicating the second wireless device is capable of receiving wakeup packets; transmit to the second wireless device an association response frame comprising the LP-WUR capability indication indicating the first wireless device is capable of transmitting wakeup packets; and transmit to the second wireless device the wakeup packet to wakeup the second wireless device.

Example 27 includes the subject matter of Example 17, and optionally, wherein the circuitry is configured to cause the wireless device to operate as a first wireless device to process a beacon frame received from a second wireless device, the beacon frame comprising the LP-WUR capability indication indicating the second wireless device is capable of transmitting wakeup packets; transmit an association request frame to the second wireless device, the association request frame comprising the LP-WUR capability indication indicating the first wireless device is capable of receiving wakeup packets; process an association response frame received from the second wireless device, the association response frame comprising the LP-WUR capability indication indicating the second wireless device is capable of transmitting wakeup packets; process reception of the wakeup packet from the second wireless device; and wakeup a radio of the first wireless device.

Example 28 includes the subject matter of Example 17, and optionally, wherein the circuitry is configured to cause the wireless device to operate as a first wireless device to transmit a probe request frame comprising the LP-WUR capability indication indicating the first wireless device is capable of receiving wakeup packets; process a probe response frame received from a second wireless device, the probe response frame comprising the LP-WUR capability indication indicating the second wireless device is capable of transmitting wakeup packets; process reception of the wakeup packet from the second wireless device; and wakeup a radio of the first wireless device.

Example 29 includes the subject matter of Example 17, and optionally, wherein the circuitry is configured to cause the wireless device to operate as a first wireless device to process a probe request frame received from a second wireless device, the probe request frame comprising the LP-WUR capability indication indicating the second wireless device is capable of receiving wakeup packets; transmit a probe response frame to the second wireless device, the probe response frame comprising the LP-WUR capability indication indicating the first wireless device is capable of transmitting wakeup packets; and transmit the wakeup packet to wakeup the second wireless device.

Example 30 includes the subject matter of any one of Examples 17-29, and optionally, wherein the capability indication is to indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

Example 31 includes a method to be performed by a wireless device, the method comprising generating a frame comprising a Low-Power Wakeup-Receiver (LP-WUR) capability indication to indicate a capability of the wireless device to process communication of a wakeup packet; and transmitting the frame.

Example 32 includes the subject matter of Example 31, and optionally, wherein the capability indication is to indicate the wireless device is capable of transmitting the wakeup packet.

Example 33 includes the subject matter of Example 32, and optionally, wherein the method is to be performed by a first wireless device, the method comprising processing a received frame from a second wireless device, the received frame comprising the LP-WUR capability indication indicating the second wireless device is capable of receiving wakeup packets; and transmitting to the second wireless device the wakeup packet to wakeup the second wireless device.

Example 34 includes the subject matter of Example 33, and optionally, wherein the received frame comprises a probe request frame, or an association request frame.

Example 35 includes the subject matter of any one of Examples 32-34, and optionally, wherein the frame comprises a beacon frame, a probe response frame, or an association response frame.

Example 36 includes the subject matter of Example 31, and optionally, wherein the capability indication is to indicate the wireless device is capable of processing a received wakeup packet.

Example 37 includes the subject matter of Example 36, and optionally, wherein the method is to be performed by a first wireless device, the method comprising processing a received frame from a second wireless device, the received frame comprising the LP-WUR capability indication indicating the second wireless device is capable of transmitting wakeup packets; processing reception of the wakeup packet from the second wireless device; and waking up a radio of the first wireless device.

Example 38 includes the subject matter of Example 37, and optionally, wherein the received frame comprises a probe response frame, a beacon frame, or an association response frame.

Example 39 includes the subject matter of Example 37 or 38, and optionally, wherein the frame comprises a probe request frame, or an association request frame.

Example 40 includes the subject matter of Example 31, and optionally, wherein the method is to be performed by a first wireless device, the method comprising transmitting a beacon frame comprising the LP-WUR capability indication indicating the first wireless device is capable of transmitting wakeup packets; processing an association request frame received from a second wireless device, the association request frame comprising the LP-WUR capability indication indicating the second wireless device is capable of receiving wakeup packets; transmitting to the second wireless device an association response frame comprising the LP-WUR capability indication indicating the first wireless device is capable of transmitting wakeup packets; and transmitting to the second wireless device the wakeup packet to wakeup the second wireless device.

Example 41 includes the subject matter of Example 31, and optionally, wherein the method is to be performed by a first wireless device, the method comprising processing a beacon frame received from a second wireless device, the beacon frame comprising the LP-WUR capability indication indicating the second wireless device is capable of transmitting wakeup packets; transmitting an association request frame to the second wireless device, the association request frame comprising the LP-WUR capability indication indicating the first wireless device is capable of receiving wakeup packets; processing an association response frame received from the second wireless device, the association response frame comprising the LP-WUR capability indication indicating the second wireless device is capable of transmitting wakeup packets; processing reception of the wakeup packet from the second wireless device; and waking up a radio of the first wireless device.

Example 42 includes the subject matter of Example 31, and optionally, wherein the method is to be performed by a first wireless device, the method comprising transmitting a probe request frame comprising the LP-WUR capability indication indicating the first wireless device is capable of receiving wakeup packets; processing of a probe response frame received from a second wireless device, the probe response frame comprising the LP-WUR capability indication indicating the second wireless device is capable of transmitting wakeup packets; processing reception of the wakeup packet from the second wireless device; and waking up a radio of the first wireless device.

Example 43 includes the subject matter of Example 31, and optionally, wherein the method is to be performed by a first wireless device, the method comprising processing a probe request frame received from a second wireless device, the probe request frame comprising the LP-WUR capability indication indicating the second wireless device is capable of receiving wakeup packets; transmitting a probe response frame to the second wireless device, the probe response frame comprising the LP-WUR capability indication indicating the first wireless device is capable of transmitting wakeup packets; and transmitting the wakeup packet to wakeup the second wireless device.

Example 44 includes the subject matter of any one of Examples 31-43, and optionally, wherein the capability indication is to indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

Example 45 includes a product comprising one or more tangible computer-readable non-transitory storage media comprising computer-executable instructions operable to, when executed by at least one computer processor, enable the at least one computer processor to implement one or more operations at a wireless device, the operations comprising generating a frame comprising a Low-Power Wakeup-Receiver (LP-WUR) capability indication to indicate a capability of the wireless device to process communication of a wakeup packet; and transmitting the frame.

Example 46 includes the subject matter of Example 45, and optionally, wherein the capability indication is to indicate the wireless device is capable of transmitting the wakeup packet.

Example 47 includes the subject matter of Example 46, and optionally, wherein the operations comprise operations to be implemented by a first wireless device, the operations comprising processing a received frame from a second wireless device, the received frame comprising the LP-WUR capability indication indicating the second wireless device is capable of receiving wakeup packets; and transmitting to the second wireless device the wakeup packet to wakeup the second wireless device.

Example 48 includes the subject matter of Example 47, and optionally, wherein the received frame comprises a probe request frame, or an association request frame.

Example 49 includes the subject matter of any one of Examples 46-48, and optionally, wherein the frame comprises a beacon frame, a probe response frame, or an association response frame.

Example 50 includes the subject matter of Example 45, and optionally, wherein the capability indication is to indicate the wireless device is capable of processing a received wakeup packet.

Example 51 includes the subject matter of Example 50, and optionally, wherein the operations comprise operations to be implemented by a first wireless device, the operations comprising processing a received frame from a second wireless device, the received frame comprising the LP-WUR capability indication indicating the second wireless device is capable of transmitting wakeup packets; processing reception of the wakeup packet from the second wireless device; and waking up a radio of the first wireless device.

Example 52 includes the subject matter of Example 51, and optionally, wherein the received frame comprises a probe response frame, a beacon frame, or an association response frame.

Example 53 includes the subject matter of Example 51 or 52, and optionally, wherein the frame comprises a probe request frame, or an association request frame.

Example 54 includes the subject matter of Example 45, and optionally, wherein the operations comprise operations to be implemented by a first wireless device, the operations comprising transmitting a beacon frame comprising the LP-WUR capability indication indicating the first wireless device is capable of transmitting wakeup packets; processing an association request frame received from a second wireless device, the association request frame comprising the LP-WUR capability indication indicating the second wireless device is capable of receiving wakeup packets; transmitting to the second wireless device an association response frame comprising the LP-WUR capability indication indicating the first wireless device is capable of transmitting wakeup packets; and transmitting to the second wireless device the wakeup packet to wakeup the second wireless device.

Example 55 includes the subject matter of Example 45, and optionally, wherein the operations comprise operations to be implemented by a first wireless device, the operations comprising processing a beacon frame received from a second wireless device, the beacon frame comprising the LP-WUR capability indication indicating the second wireless device is capable of transmitting wakeup packets; transmitting an association request frame to the second wireless device, the association request frame comprising the LP-WUR capability indication indicating the first wireless device is capable of receiving wakeup packets; processing an association response frame received from the second wireless device, the association response frame comprising the LP-WUR capability indication indicating the second wireless device is capable of transmitting wakeup packets; processing reception of the wakeup packet from the second wireless device; and waking up a radio of the first wireless device.

Example 56 includes the subject matter of Example 45, and optionally, wherein the operations comprise operations to be implemented by a first wireless device, the operations comprising transmitting a probe request frame comprising the LP-WUR capability indication indicating the first wireless device is capable of receiving wakeup packets; processing of a probe response frame received from a second wireless device, the probe response frame comprising the LP-WUR capability indication indicating the second wireless device is capable of transmitting wakeup packets; processing reception of the wakeup packet from the second wireless device; and waking up a radio of the first wireless device.

Example 57 includes the subject matter of Example 45, and optionally, wherein the operations comprise operations to be implemented by a first wireless device, the operations comprising processing a probe request frame received from a second wireless device, the probe request frame comprising the LP-WUR capability indication indicating the second wireless device is capable of receiving wakeup packets; transmitting a probe response frame to the second wireless device, the probe response frame comprising the LP-WUR capability indication indicating the first wireless device is capable of transmitting wakeup packets; and transmitting the wakeup packet to wakeup the second wireless device.

Example 58 includes the subject matter of any one of Examples 45-57, and optionally, wherein the capability indication is to indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

Example 59 includes an apparatus of wireless communication by a wireless device, the apparatus comprising means for generating a frame comprising a Low-Power Wakeup-Receiver (LP-WUR) capability indication to indicate a capability of the wireless device to process communication of a wakeup packet; and means for transmitting the frame.

Example 60 includes the subject matter of Example 59, and optionally, wherein the capability indication is to indicate the wireless device is capable of transmitting the wakeup packet.

Example 61 includes the subject matter of Example 60, and optionally, wherein the apparatus is configured for wireless communication by a first wireless device, the apparatus comprising means for processing a received frame from a second wireless device, the received frame comprising the LP-WUR capability indication indicating the second wireless device is capable of receiving wakeup packets; and means for transmitting to the second wireless device the wakeup packet to wakeup the second wireless device.

Example 62 includes the subject matter of Example 61, and optionally, wherein the received frame comprises a probe request frame, or an association request frame.

Example 63 includes the subject matter of any one of Examples 60-62, and optionally, wherein the frame comprises a beacon frame, a probe response frame, or an association response frame.

Example 64 includes the subject matter of Example 59, and optionally, wherein the capability indication is to indicate the wireless device is capable of processing a received wakeup packet.

Example 65 includes the subject matter of Example 64, and optionally, wherein the apparatus is configured for wireless communication by a first wireless device, the apparatus comprising means for processing a received frame from a second wireless device, the received frame comprising the LP-WUR capability indication indicating the second wireless device is capable of transmitting wakeup packets; means for processing reception of the wakeup packet from the second wireless device; and means for waking up a radio of the first wireless device.

Example 66 includes the subject matter of Example 65, and optionally, wherein the received frame comprises a probe response frame, a beacon frame, or an association response frame.

Example 67 includes the subject matter of Example 65 or 66, and optionally, wherein the frame comprises a probe request frame, or an association request frame.

Example 68 includes the subject matter of Example 59, and optionally, wherein the apparatus is configured for wireless communication by a first wireless device, the apparatus comprising means for transmitting a beacon frame comprising the LP-WUR capability indication indicating the first wireless device is capable of transmitting wakeup packets; means for processing an association request frame received from a second wireless device, the association request frame comprising the LP-WUR capability indication indicating the second wireless device is capable of receiving wakeup packets; means for transmitting to the second wireless device an association response frame comprising the LP-WUR capability indication indicating the first wireless device is capable of transmitting wakeup packets; and means for transmitting to the second wireless device the wakeup packet to wakeup the second wireless device.

Example 69 includes the subject matter of Example 59, and optionally, wherein the apparatus is configured for wireless communication by a first wireless device, the apparatus comprising means for processing a beacon frame received from a second wireless device, the beacon frame comprising the LP-WUR capability indication indicating the second wireless device is capable of transmitting wakeup packets; means for transmitting an association request frame to the second wireless device, the association request frame comprising the LP-WUR capability indication indicating the first wireless device is capable of receiving wakeup packets; means for processing an association response frame received from the second wireless device, the association response frame comprising the LP-WUR capability indication indicating the second wireless device is capable of transmitting wakeup packets; means for processing reception of the wakeup packet from the second wireless device; and means for waking up a radio of the first wireless device.

Example 70 includes the subject matter of Example 59, and optionally, wherein the apparatus is configured for wireless communication by a first wireless device, the apparatus comprising means for transmitting a probe request frame comprising the LP-WUR capability indication indicating the first wireless device is capable of receiving wakeup packets; means for processing of a probe response frame received from a second wireless device, the probe response frame comprising the LP-WUR capability indication indicating the second wireless device is capable of transmitting wakeup packets; means for processing reception of the wakeup packet from the second wireless device; and means for waking up a radio of the first wireless device.

Example 71 includes the subject matter of Example 59, and optionally, wherein the apparatus is configured for wireless communication by a first wireless device, the apparatus comprising means for processing a probe request frame received from a second wireless device, the probe request frame comprising the LP-WUR capability indication indicating the second wireless device is capable of receiving wakeup packets; means for transmitting a probe response frame to the second wireless device, the probe response frame comprising the LP-WUR capability indication indicating the first wireless device is capable of transmitting wakeup packets; and means for transmitting the wakeup packet to wakeup the second wireless device.

Example 72 includes the subject matter of any one of Examples 59-71, and optionally, wherein the capability indication is to indicate that the wireless device is not capable of transmitting or receiving wakeup packets, that the wireless device is capable of transmitting wakeup packets, that the wireless device is capable of receiving wakeup packets, or that the wireless device is capable of both transmitting and receiving wakeup packets.

Example 73 includes an apparatus comprising circuitry configured to cause a wireless device to transmit a Low-Power Wakeup-Receiver (LP-WUR) Power Save (PS) frame to indicate an LP-WUR mode in which a radio of the wireless device is to be at a power-save mode; switch to the LP-WUR mode; and upon receipt of a wakeup packet at a LP-WUR of the wireless device, switch the radio to an active mode, and transmit a frame to indicate that the radio is ready to receive data.

Example 74 includes the subject matter of Example 73, and optionally, wherein the LP-WUR Power Save frame comprises a PS override field comprising a predefined value to indicate whether or not a PS bit in a frame control field of a message is to indicate the wireless device is to be switched to the LP-WUR mode.

Example 75 includes the subject matter of Example 74, and optionally, wherein the apparatus is configured to cause the wireless device to transmit the LP-WUR Power Save frame comprising the predefined value; switch to the LP-WUR mode; and after switching the radio to the active mode, transmit the message comprising the PS bit indicating the wireless device is to be switched to the LP-WUR mode, and switch the radio to the LP-WUR mode.

Example 76 includes the subject matter of any one of Examples 73-75, and optionally, wherein the LP-WUR Power Save frame comprises an LP-WUR Channel field to indicate a channel to communicate the wakeup packet.

Example 77 includes the subject matter of any one of Examples 73-76, and optionally, wherein the LP-WUR Power Save frame comprises an LP-WUR preamble length field to indicate a length of a preamble of the wakeup packet.

Example 78 includes the subject matter of any one of Examples 73-77, and optionally, wherein the LP-WUR Power Save frame comprises an LP-WUR Control field to indicate the wireless device is to be switched to the LP-WUR mode.

Example 79 includes the subject matter of any one of Examples 73-78, and optionally, wherein the LP-WUR Power Save frame comprises an Access Category (AC) field comprising a first value or a second value, the first value to indicate a first latency to transmit the wakeup packet when data of at least one first access category is pending for the wireless device, the second value to indicate a second latency to transmit the wakeup packet when data of at least one second access category is pending for the wireless device, the second latency is shorter than the first latency.

Example 80 includes the subject matter of Example 79, and optionally, wherein the LP-WUR Power Save frame comprises timing information to indicate the first latency.

Example 81 includes the subject matter of Example 80, and optionally, wherein the LP-WUR Power Save frame comprises a time unit field indicating a time unit, and a maximal latency field including a value representing the first latency in terms of the time unit.

Example 82 includes the subject matter of any one of Examples 79-81, and optionally, wherein the at least one first access category comprises a best effort access category and a background access category, and the at least one second access category comprises a video access category and a voice access category.

Example 83 includes the subject matter of any one of Examples 73-82, and optionally, wherein the frame to indicate that the wireless device is ready to receive data comprises a PS-Poll frame, a data frame, or a null data frame.

Example 84 includes the subject matter of any one of Examples 73-83, and optionally, comprising the radio, and the LP-WUR.

Example 85 includes the subject matter of any one of Examples 73-84, and optionally, comprising one or more antennas, a processor, and a memory.

Example 86 includes a system of wireless communication comprising a wireless device, the wireless device comprising one or more antennas; a memory; a processor; and circuitry configured to cause the wireless device to transmit a Low-Power Wakeup-Receiver (LP-WUR) Power Save (PS) frame to indicate an LP-WUR mode in which a radio of the wireless device is to be at a power-save mode; switch to the LP-WUR mode; and upon receipt of a wakeup packet at a LP-WUR of the wireless device, switch the radio to an active mode, and transmit a frame to indicate that the radio is ready to receive data.

Example 87 includes the subject matter of Example 86, and optionally, wherein the LP-WUR Power Save frame comprises a PS override field comprising a predefined value to indicate whether or not a PS bit in a frame control field of a message is to indicate the wireless device is to be switched to the LP-WUR mode.

Example 88 includes the subject matter of Example 87, and optionally, wherein the circuitry is configured to cause the wireless device to transmit the LP-WUR Power Save frame comprising the predefined value; switch to the LP-WUR mode; and after switching the radio to the active mode, transmit the message comprising the PS bit indicating the wireless device is to be switched to the LP-WUR mode, and switch the radio to the LP-WUR mode.

Example 89 includes the subject matter of any one of Examples 86-88, and optionally, wherein the LP-WUR Power Save frame comprises an LP-WUR Channel field to indicate a channel to communicate the wakeup packet.

Example 90 includes the subject matter of any one of Examples 86-89, and optionally, wherein the LP-WUR Power Save frame comprises an LP-WUR preamble length field to indicate a length of a preamble of the wakeup packet.

Example 91 includes the subject matter of any one of Examples 86-90, and optionally, wherein the LP-WUR Power Save frame comprises an LP-WUR Control field to indicate the wireless device is to be switched to the LP-WUR mode.

Example 92 includes the subject matter of any one of Examples 86-91, and optionally, wherein the LP-WUR Power Save frame comprises an Access Category (AC) field comprising a first value or a second value, the first value to indicate a first latency to transmit the wakeup packet when data of at least one first access category is pending for the wireless device, the second value to indicate a second latency to transmit the wakeup packet when data of at least one second access category is pending for the wireless device, the second latency is shorter than the first latency.

Example 93 includes the subject matter of Example 92, and optionally, wherein the LP-WUR Power Save frame comprises timing information to indicate the first latency.

Example 94 includes the subject matter of Example 93, and optionally, wherein the LP-WUR Power Save frame comprises a time unit field indicating a time unit, and a maximal latency field including a value representing the first latency in terms of the time unit.

Example 95 includes the subject matter of any one of Examples 92-94, and optionally, wherein the at least one first access category comprises a best effort access category and a background access category, and the at least one second access category comprises a video access category and a voice access category.

Example 96 includes the subject matter of any one of Examples 86-95, and optionally, wherein the frame to indicate that the wireless device is ready to receive data comprises a PS-Poll frame, a data frame, or a null data frame.

Example 97 includes a method to be performed by a wireless device, the method comprising transmitting a Low-Power Wakeup-Receiver (LP-WUR) Power Save (PS) frame to indicate an LP-WUR mode in which a radio of the wireless device is to be at a power-save mode; switching to the LP-WUR mode; switching the radio to an active mode, upon receipt of a wakeup packet at a LP-WUR of the wireless device; and transmitting a frame to indicate that the radio is ready to receive data.

Example 98 includes the subject matter of Example 97, and optionally, wherein the LP-WUR Power Save frame comprises a PS override field comprising a predefined value to indicate whether or not a PS bit in a frame control field of a message is to indicate the wireless device is to be switched to the LP-WUR mode.

Example 99 includes the subject matter of Example 98, and optionally, comprising transmitting the LP-WUR Power Save frame comprising the predefined value; switching to the LP-WUR mode; and after switching the radio to the active mode, transmitting the message comprising the PS bit indicating the wireless device is to be switched to the LP-WUR mode, and switching the radio to the LP-WUR mode.

Example 100 includes the subject matter of any one of Examples 97-99, and optionally, wherein the LP-WUR Power Save frame comprises an LP-WUR Channel field to indicate a channel to communicate the wakeup packet.

Example 101 includes the subject matter of any one of Examples 97-100, and optionally, wherein the LP-WUR Power Save frame comprises an LP-WUR preamble length field to indicate a length of a preamble of the wakeup packet.

Example 102 includes the subject matter of any one of Examples 97-101, and optionally, wherein the LP-WUR Power Save frame comprises an LP-WUR Control field to indicate the wireless device is to be switched to the LP-WUR mode.

Example 103 includes the subject matter of any one of Examples 97-102, and optionally, wherein the LP-WUR Power Save frame comprises an Access Category (AC) field comprising a first value or a second value, the first value to indicate a first latency to transmit the wakeup packet when data of at least one first access category is pending for the wireless device, the second value to indicate a second latency to transmit the wakeup packet when data of at least one second access category is pending for the wireless device, the second latency is shorter than the first latency.

Example 104 includes the subject matter of Example 103, and optionally, wherein the LP-WUR Power Save frame comprises timing information to indicate the first latency.

Example 105 includes the subject matter of Example 104, and optionally, wherein the LP-WUR Power Save frame comprises a time unit field indicating a time unit, and a maximal latency field including a value representing the first latency in terms of the time unit.

Example 106 includes the subject matter of any one of Examples 103-105, and optionally, wherein the at least one first access category comprises a best effort access category and a background access category, and the at least one second access category comprises a video access category and a voice access category.

Example 107 includes the subject matter of any one of Examples 97-106, and optionally, wherein the frame to indicate that the wireless device is ready to receive data comprises a PS-Poll frame, a data frame, or a null data frame.

Example 108 includes a product comprising one or more tangible computer-readable non-transitory storage media comprising computer-executable instructions operable to, when executed by at least one computer processor, enable the at least one computer processor to implement one or more operations at a wireless device, the operations comprising transmitting a Low-Power Wakeup-Receiver (LP-WUR) Power Save (PS) frame to indicate an LP-WUR mode in which a radio of the wireless device is to be at a power-save mode; switching to the LP-WUR mode; switching the radio to an active mode, upon receipt of a wakeup packet at a LP-WUR of the wireless device; and transmitting a frame to indicate that the radio is ready to receive data.

Example 109 includes the subject matter of Example 108, and optionally, wherein the LP-WUR Power Save frame comprises a PS override field comprising a predefined value to indicate whether or not a PS bit in a frame control field of a message is to indicate the wireless device is to be switched to the LP-WUR mode.

Example 110 includes the subject matter of Example 109, and optionally, wherein the operations comprise transmitting the LP-WUR Power Save frame comprising the predefined value; switching to the LP-WUR mode; and after switching the radio to the active mode, transmitting the message comprising the PS bit indicating the wireless device is to be switched to the LP-WUR mode, and switching the radio to the LP-WUR mode.

Example 111 includes the subject matter of any one of Examples 108-110, and optionally, wherein the LP-WUR Power Save frame comprises an LP-WUR Channel field to indicate a channel to communicate the wakeup packet.

Example 112 includes the subject matter of any one of Examples 108-111, and optionally, wherein the LP-WUR Power Save frame comprises an LP-WUR preamble length field to indicate a length of a preamble of the wakeup packet.

Example 113 includes the subject matter of any one of Examples 108-112, and optionally, wherein the LP-WUR Power Save frame comprises an LP-WUR Control field to indicate the wireless device is to be switched to the LP-WUR mode.

Example 114 includes the subject matter of any one of Examples 108-113, and optionally, wherein the LP-WUR Power Save frame comprises an Access Category (AC) field comprising a first value or a second value, the first value to indicate a first latency to transmit the wakeup packet when data of at least one first access category is pending for the wireless device, the second value to indicate a second latency to transmit the wakeup packet when data of at least one second access category is pending for the wireless device, the second latency is shorter than the first latency.

Example 115 includes the subject matter of Example 114, and optionally, wherein the LP-WUR Power Save frame comprises timing information to indicate the first latency.

Example 116 includes the subject matter of Example 115, and optionally, wherein the LP-WUR Power Save frame comprises a time unit field indicating a time unit, and a maximal latency field including a value representing the first latency in terms of the time unit.

Example 117 includes the subject matter of any one of Examples 114-116, and optionally, wherein the at least one first access category comprises a best effort access category and a background access category, and the at least one second access category comprises a video access category and a voice access category.

Example 118 includes the subject matter of any one of Examples 108-117, and optionally, wherein the frame to indicate that the wireless device is ready to receive data comprises a PS-Poll frame, a data frame, or a null data frame.

Example 119 includes an apparatus of wireless communication by a wireless device, the apparatus comprising means for transmitting a Low-Power Wakeup-Receiver (LP-WUR) Power Save (PS) frame to indicate an LP-WUR mode in which a radio of the wireless device is to be at a power-save mode; means for switching to the LP-WUR mode; means for switching the radio to an active mode, upon receipt of a wakeup packet at a LP-WUR of the wireless device; and means for transmitting a frame to indicate that the radio is ready to receive data.

Example 120 includes the subject matter of Example 119, and optionally, wherein the LP-WUR Power Save frame comprises a PS override field comprising a predefined value to indicate whether or not a PS bit in a frame control field of a message is to indicate the wireless device is to be switched to the LP-WUR mode.

Example 121 includes the subject matter of Example 120, and optionally, comprising means for transmitting the LP-WUR Power Save frame comprising the predefined value; means for switching to the LP-WUR mode; and means for, after switching the radio to the active mode, transmitting the message comprising the PS bit indicating the wireless device is to be switched to the LP-WUR mode, and switching the radio to the LP-WUR mode.

Example 122 includes the subject matter of any one of Examples 119-121, and optionally, wherein the LP-WUR Power Save frame comprises an LP-WUR Channel field to indicate a channel to communicate the wakeup packet.

Example 123 includes the subject matter of any one of Examples 119-122, and optionally, wherein the LP-WUR Power Save frame comprises an LP-WUR preamble length field to indicate a length of a preamble of the wakeup packet.

Example 124 includes the subject matter of any one of Examples 119-123, and optionally, wherein the LP-WUR Power Save frame comprises an LP-WUR Control field to indicate the wireless device is to be switched to the LP-WUR mode.

Example 125 includes the subject matter of any one of Examples 119-124, and optionally, wherein the LP-WUR Power Save frame comprises an Access Category (AC) field comprising a first value or a second value, the first value to indicate a first latency to transmit the wakeup packet when data of at least one first access category is pending for the wireless device, the second value to indicate a second latency to transmit the wakeup packet when data of at least one second access category is pending for the wireless device, the second latency is shorter than the first latency.

Example 126 includes the subject matter of Example 125, and optionally, wherein the LP-WUR Power Save frame comprises timing information to indicate the first latency.

Example 127 includes the subject matter of Example 126, and optionally, wherein the LP-WUR Power Save frame comprises a time unit field indicating a time unit, and a maximal latency field including a value representing the first latency in terms of the time unit.

Example 128 includes the subject matter of any one of Examples 125-127, and optionally, wherein the at least one first access category comprises a best effort access category and a background access category, and the at least one second access category comprises a video access category and a voice access category.

Example 129 includes the subject matter of any one of Examples 119-128, and optionally, wherein the frame to indicate that the wireless device is ready to receive data comprises a PS-Poll frame, a data frame, or a null data frame.

Example 130 includes an apparatus comprising circuitry configured to cause a first wireless device to process a Low-Power Wakeup-Receiver (LP-WUR) Power Save (PS) frame received from a second wireless device, the LP-WUR Power Save frame to indicate an LP-WUR mode in which a radio of the second wireless device is to be at a power-save mode; transmit a wakeup packet to the second wireless device; and process a frame received from the second wireless device to indicate that the radio is ready to receive data.

Example 131 includes the subject matter of Example 130, and optionally, wherein the LP-WUR Power Save frame comprises a PS override field comprising a predefined value to indicate whether or not a PS bit in a frame control field of a message received from the second wireless device is to indicate that the second wireless device is to be switched to the LP-WUR mode.

Example 132 includes the subject matter of Example 131, and optionally, wherein the apparatus is configured to cause the first wireless device to process the LP-WUR Power Save frame comprising the PS override field comprising the predefined value; process the frame received from the second wireless device to indicate that the radio is ready to receive data; communicate data with the second wireless device; and after receiving the message comprising the PS bit indicating the second wireless device is to be switched to the LP-WUR mode, transmit another wakeup packet to the second wireless device.

Example 133 includes the subject matter of any one of Examples 130-132, and optionally, wherein the LP-WUR Power Save frame comprises an LP-WUR Channel field to indicate a channel to transmit the wakeup packet, the apparatus configured to cause the first wireless device to transmit the wakeup packet over the channel.

Example 134 includes the subject matter of any one of Examples 130-133, and optionally, wherein the LP-WUR Power Save frame comprises an LP-WUR preamble length field to indicate a length of a preamble of the wakeup packet, the apparatus configured to cause the first wireless device to generate the wakeup packet including the preamble having the length.

Example 135 includes the subject matter of any one of Examples 130-134, and optionally, wherein the LP-WUR Power Save frame comprises an LP-WUR Control field to indicate the second wireless device is to be switched to the LP-WUR mode.

Example 136 includes the subject matter of any one of Examples 130-135, and optionally, wherein the LP-WUR Power Save frame comprises an Access Category (AC) field comprising a first value or a second value, the first value to indicate a first latency to transmit the wakeup packet when data of at least one first access category is pending for the second wireless device, the second value to indicate a second latency to transmit the wakeup packet when data of at least one second access category is pending for the second wireless device, the second latency is shorter than the first latency.

Example 137 includes the subject matter of Example 136, and optionally, wherein the apparatus is configured to cause the first wireless device to transmit the wakeup packet based on the first latency, when data of the first access category is pending for the second wireless device, and to transmit the wakeup packet based on the second latency, when data of the second access category is pending for the second wireless device.

Example 138 includes the subject matter of Example 136, and optionally, wherein the LP-WUR Power Save frame comprises timing information to indicate the first latency.

Example 139 includes the subject matter of Example 138, and optionally, wherein the LP-WUR Power Save frame comprises a time unit field indicating a time unit, and a maximal latency field including a value representing the first latency in terms of the time unit.

Example 140 includes the subject matter of any one of Examples 137-139, and optionally, wherein the at least one first access category comprises a best effort access category and a background access category, and the at least one second access category comprises a video access category and a voice access category.

Example 141 includes the subject matter of any one of Examples 130-140, and optionally, wherein the frame to indicate that the second wireless device is ready to receive data comprises a PS-Poll frame, a data frame, or a null data frame.

Example 142 includes the subject matter of any one of Examples 130-141, and optionally, comprising a transceiver to transmit the wakeup packet.

Example 143 includes the subject matter of any one of Examples 130-142, and optionally, comprising one or more antennas, a processor, and a memory.

Example 144 includes a system of wireless communication comprising a first wireless device, the first wireless device comprising one or more antennas; a memory; a processor; and circuitry configured to cause the first wireless device to process a Low-Power Wakeup-Receiver (LP-WUR) Power Save (PS) frame received from a second wireless device, the LP-WUR Power Save frame to indicate an LP-WUR mode in which a radio of the second wireless device is to be at a power-save mode; transmit a wakeup packet to the second wireless device; and process a frame received from the second wireless device to indicate that the radio is ready to receive data.

Example 145 includes the subject matter of Example 144, and optionally, wherein the LP-WUR Power Save frame comprises a PS override field comprising a predefined value to indicate whether or not a PS bit in a frame control field of a message received from the second wireless device is to indicate that the second wireless device is to be switched to the LP-WUR mode.

Example 146 includes the subject matter of Example 145, and optionally, wherein the circuitry is configured to cause the first wireless device to process the LP-WUR Power Save frame comprising the PS override field comprising the predefined value; process the frame received from the second wireless device to indicate that the radio is ready to receive data; communicate data with the second wireless device; and after receiving the message comprising the PS bit indicating the second wireless device is to be switched to the LP-WUR mode, transmit another wakeup packet to the second wireless device.

Example 147 includes the subject matter of any one of Examples 144-146, and optionally, wherein the LP-WUR Power Save frame comprises an LP-WUR Channel field to indicate a channel to transmit the wakeup packet, and wherein the circuitry is configured to cause the first wireless device to transmit the wakeup packet over the channel.

Example 148 includes the subject matter of any one of Examples 144-147, and optionally, wherein the LP-WUR Power Save frame comprises an LP-WUR preamble length field to indicate a length of a preamble of the wakeup packet, and wherein the circuitry is configured to cause the first wireless device to generate the wakeup packet including the preamble having the length.

Example 149 includes the subject matter of any one of Examples 144-148, and optionally, wherein the LP-WUR Power Save frame comprises an LP-WUR Control field to indicate the second wireless device is to be switched to the LP-WUR mode.

Example 150 includes the subject matter of any one of Examples 144-149, and optionally, wherein the LP-WUR Power Save frame comprises an Access Category (AC) field comprising a first value or a second value, the first value to indicate a first latency to transmit the wakeup packet when data of at least one first access category is pending for the second wireless device, the second value to indicate a second latency to transmit the wakeup packet when data of at least one second access category is pending for the second wireless device, the second latency is shorter than the first latency.

Example 151 includes the subject matter of Example 150, and optionally, wherein the circuitry is configured to cause the first wireless device to transmit the wakeup packet based on the first latency, when data of the first access category is pending for the second wireless device, and to transmit the wakeup packet based on the second latency, when data of the second access category is pending for the second wireless device.

Example 152 includes the subject matter of Example 150, and optionally, wherein the LP-WUR Power Save frame comprises timing information to indicate the first latency.

Example 153 includes the subject matter of Example 152, and optionally, wherein the LP-WUR Power Save frame comprises a time unit field indicating a time unit, and a maximal latency field including a value representing the first latency in terms of the time unit.

Example 154 includes the subject matter of any one of Examples 151-153, and optionally, wherein the at least one first access category comprises a best effort access category and a background access category, and the at least one second access category comprises a video access category and a voice access category.

Example 155 includes the subject matter of any one of Examples 144-154, and optionally, wherein the frame to indicate that the second wireless device is ready to receive data comprises a PS-Poll frame, a data frame, or a null data frame.

Example 156 includes a method to be performed by a first wireless device, the method comprising processing a Low-Power Wakeup-Receiver (LP-WUR) Power Save (PS) frame received from a second wireless device, the LP-WUR Power Save frame to indicate an LP-WUR mode in which a radio of the second wireless device is to be at a power-save mode; transmitting a wakeup packet to the second wireless device; and processing a frame received from the second wireless device to indicate that the radio is ready to receive data.

Example 157 includes the subject matter of Example 156, and optionally, wherein the LP-WUR Power Save frame comprises a PS override field comprising a predefined value to indicate whether or not a PS bit in a frame control field of a message received from the second wireless device is to indicate that the second wireless device is to be switched to the LP-WUR mode.

Example 158 includes the subject matter of Example 157, and optionally, comprising processing the LP-WUR Power Save frame comprising the PS override field comprising the predefined value; processing the frame received from the second wireless device to indicate that the radio is ready to receive data; communicating data with the second wireless device; and after receiving the message comprising the PS bit indicating the second wireless device is to be switched to the LP-WUR mode, transmitting another wakeup packet to the second wireless device.

Example 159 includes the subject matter of any one of Examples 156-158, and optionally, wherein the LP-WUR Power Save frame comprises an LP-WUR Channel field to indicate a channel to transmit the wakeup packet, the method comprising transmitting the wakeup packet over the channel.

Example 160 includes the subject matter of any one of Examples 156-159, and optionally, wherein the LP-WUR Power Save frame comprises an LP-WUR preamble length field to indicate a length of a preamble of the wakeup packet, the method comprising generating the wakeup packet including the preamble having the length.

Example 161 includes the subject matter of any one of Examples 156-160, and optionally, wherein the LP-WUR Power Save frame comprises an LP-WUR Control field to indicate the second wireless device is to be switched to the LP-WUR mode.

Example 162 includes the subject matter of any one of Examples 156-161, and optionally, wherein the LP-WUR Power Save frame comprises an Access Category (AC) field comprising a first value or a second value, the first value to indicate a first latency to transmit the wakeup packet when data of at least one first access category is pending for the second wireless device, the second value to indicate a second latency to transmit the wakeup packet when data of at least one second access category is pending for the second wireless device, the second latency is shorter than the first latency.

Example 163 includes the subject matter of Example 162, and optionally, comprising transmitting the wakeup packet based on the first latency, when data of the first access category is pending for the second wireless device, and transmitting the wakeup packet based on the second latency, when data of the second access category is pending for the second wireless device.

Example 164 includes the subject matter of Example 162, and optionally, wherein the LP-WUR Power Save frame comprises timing information to indicate the first latency.

Example 165 includes the subject matter of Example 164, and optionally, wherein the LP-WUR Power Save frame comprises a time unit field indicating a time unit, and a maximal latency field including a value representing the first latency in terms of the time unit.

Example 166 includes the subject matter of any one of Examples 163-165, and optionally, wherein the at least one first access category comprises a best effort access category and a background access category, and the at least one second access category comprises a video access category and a voice access category.

Example 167 includes the subject matter of any one of Examples 156-166, and optionally, wherein the frame to indicate that the second wireless device is ready to receive data comprises a PS-Poll frame, a data frame, or a null data frame.

Example 168 includes a product comprising one or more tangible computer-readable non-transitory storage media comprising computer-executable instructions operable to, when executed by at least one computer processor, enable the at least one computer processor to implement one or more operations at a first wireless device, the operations comprising processing a Low-Power Wakeup-Receiver (LP-WUR) Power Save (PS) frame received from a second wireless device, the LP-WUR Power Save frame to indicate an LP-WUR mode in which a radio of the second wireless device is to be at a power-save mode; transmitting a wakeup packet to the second wireless device; and processing a frame received from the second wireless device to indicate that the radio is ready to receive data.

Example 169 includes the subject matter of Example 168, and optionally, wherein the LP-WUR Power Save frame comprises a PS override field comprising a predefined value to indicate whether or not a PS bit in a frame control field of a message received from the second wireless device is to indicate that the second wireless device is to be switched to the LP-WUR mode.

Example 170 includes the subject matter of Example 169, and optionally, wherein the operations comprise processing the LP-WUR Power Save frame comprising the PS override field comprising the predefined value; processing the frame received from the second wireless device to indicate that the radio is ready to receive data; communicating data with the second wireless device; and after receiving the message comprising the PS bit indicating the second wireless device is to be switched to the LP-WUR mode, transmitting another wakeup packet to the second wireless device.

Example 171 includes the subject matter of any one of Examples 168-170, and optionally, wherein the LP-WUR Power Save frame comprises an LP-WUR Channel field to indicate a channel to transmit the wakeup packet, comprising transmitting the wakeup packet over the channel.

Example 172 includes the subject matter of any one of Examples 168-171, and optionally, wherein the LP-WUR Power Save frame comprises an LP-WUR preamble length field to indicate a length of a preamble of the wakeup packet, comprising generating the wakeup packet including the preamble having the length.

Example 173 includes the subject matter of any one of Examples 168-172, and optionally, wherein the LP-WUR Power Save frame comprises an LP-WUR Control field to indicate the second wireless device is to be switched to the LP-WUR mode.

Example 174 includes the subject matter of any one of Examples 168-173, and optionally, wherein the LP-WUR Power Save frame comprises an Access Category (AC) field comprising a first value or a second value, the first value to indicate a first latency to transmit the wakeup packet when data of at least one first access category is pending for the second wireless device, the second value to indicate a second latency to transmit the wakeup packet when data of at least one second access category is pending for the second wireless device, the second latency is shorter than the first latency.

Example 175 includes the subject matter of Example 174, and optionally, wherein the operations comprise transmitting the wakeup packet based on the first latency, when data of the first access category is pending for the second wireless device, and transmitting the wakeup packet based on the second latency, when data of the second access category is pending for the second wireless device.

Example 176 includes the subject matter of Example 174, and optionally, wherein the LP-WUR Power Save frame comprises timing information to indicate the first latency.

Example 177 includes the subject matter of Example 176, and optionally, wherein the LP-WUR Power Save frame comprises a time unit field indicating a time unit, and a maximal latency field including a value representing the first latency in terms of the time unit.

Example 178 includes the subject matter of any one of Examples 175-177, and optionally, wherein the at least one first access category comprises a best effort access category and a background access category, and the at least one second access category comprises a video access category and a voice access category.

Example 179 includes the subject matter of any one of Examples 168-178, and optionally, wherein the frame to indicate that the second wireless device is ready to receive data comprises a PS-Poll frame, a data frame, or a null data frame.

Example 180 includes an apparatus of wireless communication by a first wireless device, the apparatus comprising means for processing a Low-Power Wakeup-Receiver (LP-WUR) Power Save (PS) frame received from a second wireless device, the LP-WUR Power Save frame to indicate an LP-WUR mode in which a radio of the second wireless device is to be at a power-save mode; means for transmitting a wakeup packet to the second wireless device; and means for processing a frame received from the second wireless device to indicate that the radio is ready to receive data.

Example 181 includes the subject matter of Example 180, and optionally, wherein the LP-WUR Power Save frame comprises a PS override field comprising a predefined value to indicate whether or not a PS bit in a frame control field of a message received from the second wireless device is to indicate that the second wireless device is to be switched to the LP-WUR mode.

Example 182 includes the subject matter of Example 181, and optionally, comprising means for processing the LP-WUR Power Save frame comprising the PS override field comprising the predefined value; means for processing the frame received from the second wireless device to indicate that the radio is ready to receive data; means for communicating data with the second wireless device; and means for, after receiving the message comprising the PS bit indicating the second wireless device is to be switched to the LP-WUR mode, transmitting another wakeup packet to the second wireless device.

Example 183 includes the subject matter of any one of Examples 180-182, and optionally, wherein the LP-WUR Power Save frame comprises an LP-WUR Channel field to indicate a channel to transmit the wakeup packet, the apparatus comprising means for transmitting the wakeup packet over the channel.

Example 184 includes the subject matter of any one of Examples 180-183, and optionally, wherein the LP-WUR Power Save frame comprises an LP-WUR preamble length field to indicate a length of a preamble of the wakeup packet, the apparatus comprising means for generating the wakeup packet including the preamble having the length.

Example 185 includes the subject matter of any one of Examples 180-184, and optionally, wherein the LP-WUR Power Save frame comprises an LP-WUR Control field to indicate the second wireless device is to be switched to the LP-WUR mode.

Example 186 includes the subject matter of any one of Examples 180-185, and optionally, wherein the LP-WUR Power Save frame comprises an Access Category (AC) field comprising a first value or a second value, the first value to indicate a first latency to transmit the wakeup packet when data of at least one first access category is pending for the second wireless device, the second value to indicate a second latency to transmit the wakeup packet when data of at least one second access category is pending for the second wireless device, the second latency is shorter than the first latency.

Example 187 includes the subject matter of Example 186, and optionally, comprising means for transmitting the wakeup packet based on the first latency, when data of the first access category is pending for the second wireless device, and transmitting the wakeup packet based on the second latency, when data of the second access category is pending for the second wireless device.

Example 188 includes the subject matter of Example 186, and optionally, wherein the LP-WUR Power Save frame comprises timing information to indicate the first latency.

Example 189 includes the subject matter of Example 188, and optionally, wherein the LP-WUR Power Save frame comprises a time unit field indicating a time unit, and a maximal latency field including a value representing the first latency in terms of the time unit.

Example 190 includes the subject matter of any one of Examples 187-189, and optionally, wherein the at least one first access category comprises a best effort access category and a background access category, and the at least one second access category comprises a video access category and a voice access category.

Example 191 includes the subject matter of any one of Examples 180-190, and optionally, wherein the frame to indicate that the second wireless device is ready to receive data comprises a PS-Poll frame, a data frame, or a null data frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a first wireless device to:
generate a beacon frame comprising a first Low-Power Wakeup-Receiver (LP-WUR) capability indication to indicate a capability of the first wireless device to transmit a wakeup packet to be received by a LP-WUR of a LP-WUR station (STA) at a LP-WUR mode, the wakeup packet to indicate that a radio of the LP-WUR STA is to be woken;
transmit the beacon frame;
receive an association request frame from a second wireless device, the association request frame comprising a second LP-WUR capability indication to indicate a capability of the second wireless device to receive the wakeup packet;
transmit to the second wireless device an association response frame comprising the first LP-WUR capability indication indicating said first wireless device is capable of transmitting the wakeup packet; and
transmit the wakeup packet to said second wireless device based on the first LP-WUR capability indication and the second LP-WUR capability indication, the wakeup packet to wakeup a radio of said second wireless device.

2. The apparatus of claim 1, wherein the first LP-WUR capability indication is to indicate that the first wireless device is capable of both transmitting and receiving the wakeup packet.

3. The apparatus of claim 1, wherein the processor is configured to cause the first wireless device to transmit the wakeup packet based on a LP-WUR Power Save (PS) frame from the second wireless device.

4. The apparatus of claim 3, wherein the LP-WUR Power Save frame comprises a PS override field to indicate whether or not a PS bit in a PS control field of a message is to indicate that said second wireless device is to be switched to the LP-WUR mode.

5. The apparatus of claim 3, wherein the LP-WUR Power Save frame comprises an LP-WUR Channel field to indicate a channel to communicate said wakeup packet.

6. The apparatus of claim 3, wherein the LP-WUR Power Save frame comprises an LP-WUR preamble length field to indicate a length of a preamble of said wakeup packet.

7. The apparatus of claim 1 comprising one or more antennas.

8. An apparatus comprising:
a memory; and
a processor configured to cause a first wireless device to:
process a beacon frame received from a second wireless device, the beacon frame comprising a first Low-Power Wakeup-Receiver (LP-WUR) capability indication indicating said second wireless device is capable of transmitting a wakeup packet to be received by a LP-WUR of a LP-WUR station (STA) at a LP-WUR mode, the wakeup packet to indicate that a radio of the LP-WUR STA is to be woken;
transmit an association request frame to the second wireless device, the association request frame comprising a second LP-WUR capability indication indicating said first wireless device is capable of receiving the wakeup packet;
process an association response frame received from the second wireless device, the association response frame comprising the first LP-WUR capability indication indicating said second wireless device is capable of transmitting the wakeup packet;
process reception of the wakeup packet from the second wireless device based on the first LP-WUR capability indication and the second LP-WUR capability indication; and
wakeup a radio of said first wireless device.

9. The apparatus of claim 8 configured to cause the first wireless device to transmit a LP-WUR Power Save (PS) frame to indicate that the first wireless device is to be at the LP-WUR mode.

10. An apparatus comprising:
a memory; and a processor configured to cause a first wireless device to:
transmit a probe request frame comprising a first Low-Power Wakeup-Receiver (LP-WUR) capability indication indicating said first wireless device is capable of receiving a wakeup packet to be received by a LP-WUR of a LP-WUR station (STA) at a LP-WUR mode, the wakeup packet to indicate that a radio of the LP-WUR STA is to be woken;
process a probe response frame received from a second wireless device, the probe response frame comprising a second LP-WUR capability indication indicating said second wireless device is capable of transmitting the wakeup packet;
process reception of the wakeup packet from said second wireless device based on the first LP-WUR capability indication and the second LP-WUR capability indication; and
wakeup a radio of said first wireless device.

11. The apparatus of claim 10 configured to cause the first wireless device to transmit a LP-WUR Power Save (PS) frame to indicate that the first wireless device is to be at the LP-WUR mode.

12. An apparatus comprising:
a memory; and
a processor configured to cause a first wireless device to:
process a probe request frame received from a second wireless device, the probe request frame comprising a first Low-Power Wakeup-Receiver (LP-WUR) capability indication indicating said second wireless device is capable of receiving a wakeup packet to be received by a LP-WUR of a LP-WUR station (STA) at a LP-WUR mode, the wakeup packet to indicate that a radio of the LP-WUR STA is to be woken;
transmit a probe response frame to the second wireless device, the probe response frame comprising a second LP-WUR capability indication indicating said first wireless device is capable of transmitting the wakeup packet; and
transmit the wakeup packet based on the first LP-WUR capability indication and the second LP-WUR capability indication, the wakeup packet to wakeup a radio of the second wireless device.

13. The apparatus of claim 12, wherein the processor is configured to transmit the wakeup packet based on a LP-WUR Power Save (PS) frame from the second wireless device.

14. The apparatus of claim 13, wherein the LP-WUR Power Save frame comprises an LP-WUR preamble length field to indicate a length of a preamble of said wakeup packet.

15. A product comprising one or more tangible computer-readable non-transitory storage media comprising computer-executable instructions operable to, when executed by at least one processor, enable the at least one processor to cause a first wireless device to:
generate a probe request frame comprising a first Low-Power Wakeup-Receiver (LP-WUR) capability indication to indicate a capability of the first wireless device to receive a wakeup packet to be received by a LP-WUR of a LP-WUR station (STA) at a LP-WUR mode, the wakeup packet to indicate that a radio of the LP-WUR STA is to be woken;
transmit the probe request frame;
process a probe response frame received from a second wireless device, the probe response frame comprising a second LP-WUR capability indication to indicate a capability of the second wireless device to transmit the wakeup packet;
process reception of the wakeup packet based on the first LP-WUR capability indication and the second LP-WUR capability indication; and wakeup a radio of said first wireless device.

16. The product of claim 15, wherein the first LP-WUR capability indication is to indicate that the first wireless device is capable of both transmitting and receiving the wakeup packet.

17. An apparatus comprising:
a memory; and
a processor configured to cause a wireless device to:
transmit a Low-Power Wakeup-Receiver (LP-WUR) Power Save (PS) frame to indicate an LP-WUR mode in which a radio of the wireless device is to be at a power-save mode and a LP-WUR of the wireless device is to wait for a wakeup packet, the wakeup packet to indicate that the radio of the wireless device is to be woken, wherein the LP-WUR PS frame comprises a PS override field to indicate that a PS bit in a frame control field of a message is to indicate that said wireless device is to be switched to the LP-WUR mode;
switch to the LP-WUR mode;
upon receipt of the wakeup packet at the LP-WUR of the wireless device, switch the radio to an active mode, and transmit a frame to indicate that said radio is ready to receive data; and
after switching the radio to the active mode, transmit said message comprising said PS bit indicating said wireless device is to be switched to the LP-WUR mode, and switch said wireless device to the LP-WUR mode.

18. The apparatus of claim 17, wherein the LP-WUR Power Save frame comprises an LP-WUR Channel field to indicate a channel to communicate said wakeup packet.

19. The apparatus of claim 17, wherein the LP-WUR Power Save frame comprises an LP-WUR preamble length field to indicate a length of a preamble of said wakeup packet.

20. The apparatus of claim 17, wherein the LP-WUR Power Save frame comprises an LP-WUR Control field to indicate said wireless device is to be switched to the LP-WUR mode.

21. The apparatus of claim 17, wherein the LP-WUR Power Save frame comprises an Access Category (AC) field comprising a first value or a second value, the first value to indicate a first latency to transmit the wakeup packet when data of at least one first access category is pending for said wireless device, the second value to indicate a second latency to transmit the wakeup packet when data of at least one second access category is pending for said wireless device, said second latency is shorter than said first latency.

22. The apparatus of claim 21, wherein the LP-WUR Power Save frame comprises timing information to indicate said first latency.

23. The apparatus of claim 17 comprising said radio, and said LP-WUR.

24. An apparatus comprising:
a memory; and
a processor configured to cause a first wireless device to:
process a Low-Power Wakeup-Receiver (LP-WUR) Power Save (PS) frame received from a second wireless device, said LP-WUR Power Save frame to indicate an LP-WUR mode in which a radio of the second wireless device is to be at a power-save mode and a LP-WUR of the second wireless device is to wait for a wakeup packet, the wakeup packet to indicate that the radio of the second wireless device is to be woken, the LP-WUR PS frame comprising a PS override field to indicate that a PS bit in a frame control field of a message received from the second wireless device is to indicate that said second wireless device is to be switched to the LP-WUR mode;

transmit said wakeup packet to said second wireless device;

process a frame received from the second wireless device to indicate that said radio is ready to receive data;

communicate data with said second wireless device; and after receiving the message comprising said PS bit indicating said second wireless device is to be switched to the LP-WUR mode, transmit another wakeup packet to said second wireless device.

25. The apparatus of claim 24, wherein the LP-WUR Power Save frame comprises an LP-WUR Control field to indicate said second wireless device is to be switched to the LP-WUR mode.

* * * * *